(12) United States Patent
Misev et al.

(10) Patent No.: US 9,434,853 B2
(45) Date of Patent: Sep. 6, 2016

(54) LOW TEMPERATURE HEAT-CURABLE POWDER COATING COMPOSITION COMPRISING A CRYSTALLINE POLYESTER RESIN, AN AMORPHOUS RESIN AND A PEROXIDE

(75) Inventors: Tosko Misev, Zwolle (NL); Leendert Jan Molhoek, Zwolle (NL); Johan Franz Gradus Jansen, Echt (NL); Matthias Johannes Cornelis Bos, Zwolle (NL); Gerrit Johannes De Lange, Zwolle (NL); Gerbert Dijkstra, Zwolle (NL)

(73) Assignee: DSM IP ASSETS B.V., Heerlen (NL)

( * ) Notice: Subject to any disclaimer, the term of this patent is extended or adjusted under 35 U.S.C. 154(b) by 817 days.

(21) Appl. No.: 13/643,194

(22) PCT Filed: May 6, 2011

(86) PCT No.: PCT/EP2011/057293

§ 371 (c)(1),
(2), (4) Date: Dec. 7, 2012

(87) PCT Pub. No.: WO2011/138431

PCT Pub. Date: Nov. 10, 2011

(65) Prior Publication Data

US 2013/0211002 A1      Aug. 15, 2013

(30) Foreign Application Priority Data

May 6, 2010    (EP) ..................................... 10162167

(51) Int. Cl.
| | |
|---|---|
| *C08K 5/14* | (2006.01) |
| *C08L 67/02* | (2006.01) |
| *C09D 5/03* | (2006.01) |
| *C09D 167/06* | (2006.01) |
| *C09D 167/02* | (2006.01) |

(52) U.S. Cl.
CPC ............... *C09D 167/02* (2013.01); *C08K 5/14* (2013.01); *C09D 167/06* (2013.01); *C08L 2205/025* (2013.01); *C09D 5/03* (2013.01)

(58) Field of Classification Search
CPC ............................. C09D 167/06; C08G 63/52
See application file for complete search history.

(56) References Cited

U.S. PATENT DOCUMENTS

| | | | | |
|---|---|---|---|---|
| 3,959,209 A | * | 5/1976 | Lake ........................ | C08L 67/06 523/527 |
| 5,304,332 A | | 4/1994 | Richart | |
| 5,480,726 A | | 1/1996 | Richart | |
| 5,763,099 A | * | 6/1998 | Misev et al. ................... | 428/482 |
| 5,922,473 A | | 7/1999 | Muthiah et al. | |
| 6,005,017 A | | 12/1999 | Daly et al. | |
| 6,011,080 A | * | 1/2000 | Daly ..................... | C09D 167/06 427/180 |
| 6,017,593 A | | 1/2000 | Daly et al. | |
| 6,048,949 A | | 4/2000 | Muthiah et al. | |
| 6,194,525 B1 | * | 2/2001 | Ortiz .................... | B29C 37/0032 428/482 |
| 6,235,228 B1 | | 5/2001 | Nicholl et al. | |
| 6,767,971 B1 | * | 7/2004 | Yamaguchi ............. | C08L 67/06 523/500 |

FOREIGN PATENT DOCUMENTS

| | | |
|---|---|---|
| EP | 55-27324 | 2/1980 |
| EP | 0 431 656 | 6/1991 |
| EP | 0 636 669 | 2/1995 |
| EP | 0 844 286 | 5/1998 |
| EP | 0 942 050 | 9/1999 |
| EP | 0 957 141 | 11/1999 |
| EP | 0 957 142 | 11/1999 |
| EP | 1 195 392 | 4/2002 |
| EP | 1 195 393 | 4/2002 |
| EP | 1 023 353 | 2/2004 |
| EP | 1 398 357 | 3/2004 |
| EP | 1 424 142 | 6/2004 |
| EP | 1 477 534 | 11/2004 |
| JP | 47-026189 | 7/1972 |
| NL | WO 9727253 A1 * | 7/1997 ............... C09D 5/03 |
| WO | 97/27253 | 7/1997 |
| WO | 97/38034 | 10/1997 |
| WO | WO 97/38034 | 10/1997 |
| WO | 99/14254 | 3/1999 |
| WO | 02/100957 | 12/2002 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |
| WO | WO 2010/052290 | 5/2010 |
| WO | WO 2010/052291 | 5/2010 |

OTHER PUBLICATIONS

International Search Report for PCT/EP2011/057293, mailed Aug. 24, 2011.

* cited by examiner

*Primary Examiner* — Brieann R Fink
(74) *Attorney, Agent, or Firm* — Nixon & Vanderhye P.C.

(57) ABSTRACT

Heat-curable powder coating compositions are provided which include i) at least one crystalline polyester resin present in an amount of at least 7.5 wt %; ii) at least one amorphous polyester resin present in an amount of at most 92.5 wt %; and iii) at least one peroxide present in an amount of at least 0.65 parts of peroxide in hundred parts of i)+ii) (pph), wherein the at least one crystalline polyester resin has 2-butenedioic acid ethylenic unsaturations and/or the at least one amorphous polyester resin has 2-butenedioic acid ethylenic unsaturations. The compositions may be cured to an acceptable degree at low temperature, e.g., 130° C. /20 minutes offering powder coatings that may exhibit enhanced flexibility and good adhesion. In addition, the compositions can suitably be used on heat- and/or non heat-sensitive substrates, even if the composition is highly pigmented.

72 Claims, No Drawings

LOW TEMPERATURE HEAT-CURABLE POWDER COATING COMPOSITION COMPRISING A CRYSTALLINE POLYESTER RESIN, AN AMORPHOUS RESIN AND A PEROXIDE

This application is the U.S. national phase of International Application No. PCT/EP2011/057293, filed 6 May 2011, which designated the U.S. and claims priority to EP Application No. 10162167.0 filed 6 May 2010, the entire contents of each of which are hereby incorporated by reference.

The invention relates to a heat-curable powder coating composition, a process for the preparation thereof, a process for coating a substrate with said composition, a substrate coated with said composition and/or to use of the heat-curable powder coating composition.

Powder coating compositions (commonly referred to as "powders") which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded article to be coated. The article usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The invention relates to the field of thermosetting powder coating compositions. By "thermosetting powder coating compositions" is meant herein, a mixture of components and which compositions have the ability to form an irreversible crosslinked network (the so-called 'cured form') upon curing, preferably heat curing. The preparation of thermosetting powder coating compositions is described by Misev in "Powder Coatings, Chemistry and Technology" (pp. 224-300; 1991, John Wiley & Sons Ltd.).

As shown by the article "Overview of the powder coatings market worldwide" by G. Maggiore in Pitture e Vernice Europe 1/92, pp. 15-22 and by the lecture by D. Richart "Powder Coating: Current Developments, Future Trends" (Waterborne, High-Solids and Powder Coatings Symposium, Feb. 22-24, 1995), the search is still continuing for powder coating compositions which can be cured with little thermal stress of the substrate and which consequently are suitable for use on heat-sensitive substrates such as, for example, wood and plastic.

Heat-sensitive substrates may be coated using radiation curable powder coating compositions, such as described in EP 0636669. However, when using heavily pigmented powder coating compositions, there is a chance that the radiation does not penetrate through the powder coating composition resulting in an unevenly cured powder coating. Also, when using radiation to cure a powder coating composition on complex three-dimensional objects, the radiation may not reach all corners of the object, also resulting in an unevenly cured coating.

Besides the desire for a powder coating composition that can be cured at low temperature, it is also desired that such a powder coating composition can still be ground, sieved, extrudable and/or evenly cured. This is useful for commercially viable powders since said compositions can prepared in existing powder paint job shops without major investments in new equipment or fundamentally different processes. Furthermore, it would be desirable to provide flexible powder coatings that may sustain substrate stresses without been delaminated and/or cracked. This is especially useful when the article to be powder coated has a complex three-dimensional shape and/or when a coating is used on furniture, such as wooden/metal chairs and kitchen cabinets.

It is therefore an object of the invention is to address some or all of the problems identified herein.

Therefore, broadly in accordance with the invention there is provided a heat-curable powder coating composition comprising:
  i) at least one crystalline polyester resin present in an amount of at least 7.5 wt %; and
  ii) at least one amorphous polyester resin present in an amount of at most 92.5 wt %; and
  iii) at least one peroxide present in an amount of at least 0.65 parts of peroxide in hundred parts of i)+ii) (pph), wherein,
    the at least one crystalline polyester resin has 2-butenedioic acid ethylenic unsaturations and/or the at least one amorphous polyester resin has 2-butenedioic acid ethylenic unsaturations;
    if the at least one amorphous polyester resin has 2-butenedioic acid ethylenic unsaturations, then the theoretical weight per ethylenic unsaturation (WPU) of the at least one amorphous polyester resin is at most 850 g/mol;
    the wt % is based on the total amount of i)+ii);
    the peroxide is chosen from the group of peresters and monopercarbonates according to formula (I)

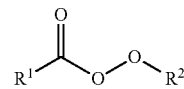

(I)

wherein $R^1$ represents an optionally substituted $C_{1-20}$alkyl, a $C_{6-20}$aryl or for $OR^5$, wherein $R^5$ represents an optionally substituted $C_{1-20}$alkyl or for an optionally substituted $C_{6-20}$aryl; $R^2$ represents an optionally substituted $C_{1-20}$alkyl or for an optionally substituted $C_{6-20}$aryl; and peranhydrides of formula (II)

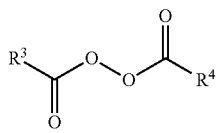
(II)

wherein $R^3$ and $R^4$ each independently stand for an optionally substituted $C_{1-20}$alkyl, a $C_{6-20}$aryl or for $OR^6$, wherein $R^6$ represents an optionally substituted $C_{1-10}$alkyl or a$C_{6-20}$aryl; and any combination of peroxides according to formula (I) and formula (II) thereof.

The composition of the invention is heat-curable and it may be cured to an acceptable degree at low temperature of for example at most 130° C. for at most 20 minutes. The composition of the invention may be ground, sieved and extrudable, whilst said composition upon heat cure can provide powder coatings that may also exhibit enhanced flexibility as the latter is defined herein.

The composition of the invention upon heat curing may also provide powder coatings that exhibit good adhesion as defined herein.

The composition of the invention can suitably be used on heat- and/or non heat-sensitive, even if the composition is highly pigmented or if the composition is used on a three dimensional complex article. Furthermore, since it is not necessary to use a lot of energy to cure the powder coating composition, the composition of the invention also has environmental benefits.

Unless otherwise stated, the total amount (wt %) of i)+ii) equals 100%.

Preferably, of the at least crystalline polyester resin and the at least one amorphous polyester resin of the composition of the invention have each di-acid ethylenic unsaturations; wherein the di-acid ethylenic unsaturation of the at least one crystalline polyester resin and/or the di-acid ethylenic unsaturation of the at least one amorphous polyester resin is a 2-butenedioic acid ethylenic unsaturation.

Preferably the at least one crystalline polyester resin of the composition of the invention is present in an amount of at most 85 wt % and the at least one amorphous polyester resin of the composition of the invention is present in an amount of at least 15 wt %.

Preferably, the at least one crystalline polyester resin and the at least amorphous polyester resin of the composition of the invention have each a theoretical Mn of at least 2,200 Da and of at most 8,000 Da.

Preferably the at least one amorphous polyester resin of the composition of the invention has 2-butenedioic acid ethylenic unsaturations and a theoretical weight per ethylenic unsaturation (WPU) of at most 850 g/mol.

Preferably the at least one crystalline polyester resin and/or the at least one amorphous polyester resin of the composition of the invention has besides 2-butenedioic acid ethylenic unsaturations also other ethylenic unsaturations based on di-acid or anhydride monomers. Preferably the other ethylenic unsaturations based on di-acid or anhydride monomers are chosen from the group of itaconic acid, citraconic acid, mesaconic acid, anhydrides of itaconic acid and mixtures thereof.

Preferably both the at least one crystalline polyester resin and the at least one amorphous polyester resin, have each 2-butenedioic acid ethylenic unsaturations.

Preferably, both the at least one crystalline polyester resin and the at least one amorphous polyester resin, have each only 2-butenedioic acid ethylenic unsaturations.

Preferably, the peroxide is present in an amount of at least 0.8 pph.

Preferably the composition of the invention further comprises a transition metal compound.

Preferably the composition of the invention further comprises a transition metal compound chosen from the group of transition metal salts, transition metal complexes and mixtures thereof, of transition metals chosen from the group of Mn, Fe, Co and Cu.

Preferably, $R^2$ represents tert-butyl.

Preferably, $R^1$ represents phenyl and $R^2$ represents tert-butyl.

Preferably, $R^3$ and $R^4$ both represent phenyl or both represent undecane.

Preferably, the composition of the invention further comprises an inhibitor chosen from the group of phenolic compounds, stable radicals, catechols, phenothiazines, hydroquinones, benzoquinones or mixtures thereof.

In the composition of the invention, the amount of the at least one crystalline polyester resin is preferably at least 7.5, more preferably at least 10, even more preferably at least 15, most preferably at least 17.5, especially at least 20, more especially at least 25 wt % based on the total amount of i)+ii). Preferably the amount of the at least one crystalline polyester resin is at most 90, more preferably at most 80, even more preferably at most 75, most preferably at most 70, especially at most 65, more especially at most 60, most especially at most 55, for example at most 50, for example at most 40 wt % based on the total amount of i)+ii). In the composition of the invention, the amount of the at least one crystalline polyester resin is preferably in the range of 10-40 wt % based on the total amount of i)+ii).

In the composition of the invention, the amount of the at least one amorphous polyester resin is preferably at least 10, more preferably at least 20, even more preferably at least 25, most preferably at least 30, especially at least 35, more especially at least 40, most especially at least 45, for example at least 50, for example at least 60 wt % based on the total amount of i)+ii). Preferably the amount of the at least one amorphous polyester resin is at most 92.5, more preferably at most 90, even more preferably at most 85, most preferably at most 82.5, especially at most 80, more especially at most 75 wt % based on the total amount of i)+ii). In the composition of the invention, the amount of the at least one amorphous polyester resin is preferably in the range of 60-90 wt % based on the total amount of i)+ii).

Preferably the composition of the invention is substantially free of a crosslinking agent.

Definitions

By "cure to an acceptable degree at low temperatures" is meant that the powder coating when cured at most 130° C. for at most 20 minutes, is able to resist at least 100 acetone double rubs (ADR).

By "enhanced flexibility" is meant herein that a powder coating presented at least 1.0 mm of minimum depth of indentation to cause failure as measured using the cupping test according to ISO1520:2006. More preferred powder coatings have at least 1.2 mm of minimum depth of indentation to cause failure.

By "good adhesion" is meant herein that the adhesion of a powder coating is characterized as G0 to G3 on a scale from G0 (best adhesion) to G5 (worst adhesion) when measured according to a cross-cut test ('Gitterschnitt') in accordance with ISO 2409 (edition 3, dated 15 May 2007) as described herein. More preferred powder coatings have adhesion characterized as G0 to G2.

By "curing" is meant herein the process of becoming "set" that is to form an irreversibly crosslinked network (the so-called "cured form"), a material that can no longer flow, be melted or dissolved. Herein, the terms "curing" "cure" and crosslinking" are used interchangeably. Preferably, the curing of the heat-curable powder coating composition of the invention takes place using heat and in that case the curing can be called "heat curing". For clarity, the term heat curing does not include ultraviolet (UV) or electron beam induced curing. Optionally, a combination of heat and pressure can be used to cure the heat-curable powder coating compositions of the invention. In the context of the invention, the term "heat curing" does not exclude the application of pressure along with heat in order to cure the heat-curable powder coating compositions of the invention.

By "room temperature" is meant herein a temperature of 23° C.

A "resin" is herein understood to have the same meaning as it has to a skilled person in thermosetting polymer chemistry, namely as a low molecular weight polymer having reactive moieties such as for example ethylenic unsaturations, said polymer is able to crosslink. The term "low molecular weight" means a theoretical number average molecular weight (Mn) lying between a few hundred Da, e.g. 1,000, and a few thousand Da, e.g. 20,000. Preferably the Mn is at most 15,000 Da, even more preferably is at most 8,000, most preferably is at most 7,000, especially is at most 6,000, more especially is at most 5,000 Da. Preferably the Mn is at least 1,500, more preferably is at least 1,800, even more preferably is at least 2,000, most preferably is at least 2,200 Da. Preferably the Mn is at least 2,250, more preferably is at least 2,300, even more preferably is at least 2,350, most preferably is at least 2,400 Da. A resin may for example be a low molecular weight polyester, especially a low molecular weight polyester having 2-butenedioic acid ethylenic unsaturations. Therefore, a polyester resin is a polyester with a theoretical Mn as described above in the same paragraph. In the case of a neat resin, these reactive moieties via a chemical reaction preferably induced by means of heat, ultimately connect the polymer chains together through the formation of permanent covalent (crosslink) bonds, resulting to the cured resin. A resin is classified as acid functional in case its hydroxyl value (OHV) is lower than its acid value (AV). A resin is classified as hydroxyfunctional in case its acid value is lower than its hydroxyl value. In the context of the invention the acid value of a resin (AV in mg KOH/g of resin) is measured titrimetrically according to ISO 2114-2000, whereas the hydroxyl value of a resin (OHV in mg KOH/g of resin) is measured using ISO 4629-1978. The acid value of a polyester resin is a measure for the amount of acid groups in the polyester resin whereas the hydroxyl value of a polyester resin is a measure for the amount of hydroxyl groups in the polyester resin.

By "crosslinking agent" or "co-crosslinker" is meant herein any organic monomer, oligomer or polymer having unsaturations that are reactable with the ethylenic unsaturations of an unsaturated resin to be crosslinked, said unsaturations of the crosslinking agent are different from those of the unsaturated resin, the crosslinking agent having an Mn ranging from at least 100 to at most 20,000 Da. Preferred crosslinking agents have an Mn of less than 2,200 Da. The crosslinking agent, may be chosen from the group of components bearing acrylate, methacrylate, vinylester, vinylether, vinyl amide, alkyne ether, alkyne ester, alkyne amide, alkyne amine, propargyl ether, propargyl ester, itaconate, enamine, thiol, allyl (or combinations thereof) groups and/or mixtures of aforementioned components. The crosslinking agent can be a compound, an oligomer or a polymer. The crosslinking agent can be a combination of an amorphous with a crystalline and/or even with a liquid component. An example of liquid crosslinking agent is a vinylacetate. An example of a crosslinking agent that is a polymer is a polyester resin having itaconic acid ethylenic unsaturations; said polyester resin may be obtainable from itaconic acid and/or derivatives thereof.

By "composition" is meant herein the combining and/or mixture of distinct chemical substances and/or components to form a whole.

By "powder" is meant herein, a substantially dry solid substance reduced to a state of fine, loose particles wherein the individual particles have a maximum particle size of at most 130 μm at 23° C. and at atmospheric pressure, for example a particle size of at most 110 μm, for example of at most 90 μm at 23° C. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms "particle size" and "particle size distribution" will be used interchangeably in the context of the invention when used in relation to a powder. The method used to measure the particle size of the granular material according to the invention is sieve analysis. According to it, the powder is separated on sieves of different sizes. Thus, the PSD is defined in terms of discrete size ranges: e.g. "% of sample powder has particle size in the range of 80 microns to 90 microns", when sieves of these sizes are used.

By "substantially dry" is meant herein that the component does not contain any deliberately added water or moisture but the component may contain moisture absorbed from the atmosphere in an amount of up to 30, preferably up to 20% w/w based on the total weight of the component.

By "heat-curable powder coating composition" is meant herein a composition in the form of a powder at 23° C., said composition has the ability to cure upon heating. For clarity, the composition of the invention is heat-curable.

The term '(semi)crystalline' denotes both crystalline and semicrystalline.

The terms amorphous, semicrystalline, crystalline used to characterize a polymer are informal terms used in the art to indicate the predominant character of the relevant polymer in respect to its degree of crystallinity but these terms are defined more precisely herein by melting enthalpy (ΔHm) values.

By "amorphous" is meant herein that a component has a melting enthalpy (ΔHm) lower than 40 J/g. Preferably the amorphous component does not have a melting temperature (Tm).

By "crystalline" is meant herein that a component has a melting enthalpy (ΔHm) of at least 40 J/g and it has a melting temperature. Preferably, the melting enthalpy (ΔHm) of the crystalline component is at least 50, more preferably at least 60 J/g and/or at most 150, for example at most 140, for example at most 130 J/g. The melting enthalpy (ΔHm) is measured using DSC as described herein.

The term "ethylenic unsaturation" as used herein means cis- or trans-configured reactive carbon-carbon double bond unsaturation and does not include aromatic unsaturation, carbon-carbon triple bond, carbon-heteroatom unsaturation.

By "unsaturated resin" is meant herein a resin having ethylenic unsaturations. For example a polyester resin having 2-butenedioic acid ethylenic unsaturations, is an unsaturated polyester resin.

By "thermal radical initiator" is meant herein any organic compound that upon heating is able to generate free radicals and initiate radical crosslinking in the composition of the invention.

By peroxide is meant herein any of a class of organic compounds whose molecules contain two oxygen atoms bound together and upon heating generates free radicals and initiates radical crosslinking in the composition of the invention. Peroxide is a thermal radical initiator.

By "powder coating" is meant herein the partially or fully cured form of the heat-curable powder coating composition of the invention.

By "the composition of the invention is substantially free of a crosslinking agent" is meant herein that the composition contains at most 10, preferably at most 8, more preferably at most 6, even more preferably at most 4, most preferably at most 2, especially at most 1 parts of a crosslinking agent in hundred parts of resin (pph), more especially the composition of the invention contains no crosslinking agent. The calculation of pph is based on the weight of a crosslinking agent calculated on the total weight of resins normalized to 100 parts of resins.

By "article" is meant herein an individual object or item or element of a class designed to serve a purpose or perform a special function and can stand alone.

The term 'di-acid' as used herein means a dicarboxylic acid or dianhydride or diester or other derivatives of a dicarboxylic acid such as for examples dicarboxylic acid salts.

The term 'di-acid ethylenic unsaturations' as used herein means ethylenic unsaturations obtainable from any isomer of an unsaturated di-acid and/or derivatives thereof, such as for example ethylenic unsaturations obtainable from a di-acid chosen from the group of 2-butenedioic acid, 2-methyl-2-butenedioic acid, itaconic acid and mixtures thereof. Derivatives of any isomer of unsaturated di-acids include esters, anhydrides, acid salts. Fumaric acid and maleic acid are isomers of 2-butenedioic acid, whereas citraconic acid and mesaconic acid are isomers of 2-methyl-2-butebedioic acid. For example "di-acid ethylenic unsaturations" may be obtainable from fumaric, maleic, itaconic, citraconic and/or mesaconic acids, derivatives thereof and/or mixtures thereof.

Fumaric acid based unsaturation is an informal term used herein to denote unsaturation derived from fumaric acid, its isomers e.g. maleic acid and/or derivatives thereof.

By "polyester resin having 2-butenedioic acid ethylenic unsaturations" is meant herein, a polyester resin comprising ethylenic unsaturations obtainable from any isomer of 2-butenedioic acid and/or derivatives thereof. Fumaric acid and maleic acid are isomers of 2-butenedioic acid. Maleic acid is the cis-isomer of 2-butenedioic acid, whereas fumaric acid is the trans-isomer of 2-butenedioic acid. Derivatives of any isomer of 2-butenedioic acid include esters, anhydrides, acid salts. The "polyester resin having 2-butenedioic acid ethylenic unsaturations" may for example be prepared from fumaric, and/or maleic acids, derivatives thereof and/or mixtures thereof. Derivatives of fumaric acid and of maleic acid include esters, anhydrides, acid salts. Maleic acid and maleic acid anhydride partly isomerize to fumaric acid when used in the synthesis of a polyester resin having 2-butene-dioic acid ethylenic unsaturations.

The "polyester resin having 2-butenedioic acid ethylenic unsaturations" may for example be prepared from fumaric acid and/or fumaric acid derivatives and/or maleic acid and/or maleic acid derivatives and/or mixtures thereof. Derivatives of fumaric acid and of maleic acid include esters, anhydrides, acid salts. Maleic acid and maleic acid anhydride partly isomerize to fumaric acid when used in the synthesis of a polyester resin having 2-butenedioic acid ethylenic unsaturations.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By "Mn" is meant herein the theoretical number average molecular weight and it is calculated as shown in the Examples unless stated otherwise.

By "WPU" is meant herein the theoretical weight per ethylenic unsaturation, unless otherwise stated. The WPU is calculated by dividing the Mn of a compound, for a example an unsaturated polyester resin as described herein, by the amount of ethylenic unsaturations as added during the synthesis of said compound. The WPU may also be measured ("measured WPU"), for example using $^1$H-NMR, for example as described in Journal of Applied Polymer Science, Vol. 23, 1979, pp 25-38, the complete disclosure of which is hereby incorporated by reference, or via $^1$H-NMR on a 300 MHz Varian NMR-spectrometer using pyrazine as internal standard. In the Examples, the WPU was also determined via $^1$H-NMR on a 300 MHz Varian NMR-spectrometer using pyrazine as internal standard and in this case the WPU is referred to as the "measured WPU". If the WPU refers to a crosslinking agent, then by "WPU" is meant herein the theoretical weight per the type of unsaturation the crosslinking agent has and the WPU of the crosslinking agent is calculated by dividing the Mn of the crosslinking agent by the amount of the unsaturations as added during the synthesis of the crosslinking agent. The WPU of a crosslinking agent may also be measured experimentally for example using $^1$H-NMR as described herein above.

By "pph" is meant herein parts of an ingredient in the composition of the invention per hundred parts of resins.

The glass transition temperature (Tg) (inflection temperature), melting temperature (Tm), crystallization temperarure (Tc) and melting enthalpy (ΔHm) measurements were carried out via differential scanning calorimetry (DSC) on a Mettler Toledo, TA DSC821, in $N_2$ atmosphere as described herein.

By "viscosity" (η) is meant herein the melt viscosity (in Pa·s) at 160° C. Viscosity measurements were carried out at 160° C., on a Rheometric Scientific CT 5 (Rm 265) apparatus (Mettler Toledo). The applied shear-rate is 70 $s^{-1}$ and a 30 mm spindle was used.

By "(N)IR lamp" is meant herein denotes both a Near-IR lamp and an IR lamp.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The term "comprising" as used herein means that the list that immediately follows is non exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90% w/w, preferably greater than or equal to 95% w/w, more preferably greater than or equal to 98% w/w of the total amount of the given material. The term "consisting of" as used herein mean that the list that follows is exhaustive and does not include additional items.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein. Unless otherwise stated, the total amount (wt %) of i)+ii) equals 100%.

Unless the context clearly indicates otherwise, as used herein plural forms of the terms herein (for example composition, component, resin, polymer,) are to be construed as including the singular form and vice versa.

Resins & Blends Thereof

The composition of the invention preferably comprises polyester resins, more preferably unsaturated polyester resins, even more preferably polyester resins having di-acid ethylenic unsaturations, most preferably polyester resins having 2-butenedioic acid ethylenic unsaturations. The polyester resins of the invention may be amorphous or crystalline.

Polyester resins are generally polycondensation products of polyalcohols and polycarboxylic acids. According to the invention a polyester resin is preferably the polycondensation product of polyalcohols and polycarboxylic acids, more preferably a polyester resin is the polycondensation product of dicarboxylic acids, dialcohols (diols) and trifunctional alcohols or carboxylic acids.

Examples of polycarboxylic acids, especially dicarboxylic acids which may be used in the preparation of a polyester resin include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative polycarboxylic acids can be used in their acid form or where available, in the form of their anhydrides, acyl chlorides or lower alkyl esters. Mixtures of polycarboxylic acids can also be used. In addition hydroxycarboxylic acids and lactones can be used. Examples include hydroxypivalic acid and ε-caprolactone.

Polyalcohols, in particular diols, can be reacted with the carboxylic acids or their analogues as described above to prepare the polyester resin. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Monofunctional carboxylic acids, for example para-tert-butyl benzoic acid, benzoic acid, methyl benzoic acid, cinnamic acid, crotonic acid may be used to block the polymer chain.

Trifunctional or more functional alcohols or carboxylic acids can be used to obtain branched polyesters. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid dimethylolpropionic acid (DMPA).

The polyesters can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester resin.

The conditions for preparing a polyester resin and the COOH/OH ratio can be chosen such that end products are obtained which have an acid value or hydroxyl value which is within the intended range of values.

The polyesters of the compositions of the invention may also have di-acid ethylenic unsaturations. Examples of how to introduce di-acid ethylenic unsaturations, such as 2-butenedioic acid ethylenic unsaturations, in the polyester resin are described herein. The 2-butendioic acid ethylenic unsaturations may be present in the backbone of the polyester resin, pendant on the backbone of the polyester resin, at the terminus of the polyester resin or at a combination of these locations. The 2-butenedioic acid ethylenic unsaturation may be built into the polyester resin backbone, for instance by reacting a hydroxyl functional monomer (such as the polyalcohols mentioned herein) with an unsaturated di-acid monomer as mentioned above. It is also possible to connect the ethylenic unsaturation to the terminus (or termini) of the polyester resin, for example by reacting a hydroxyl functional terminal group of the polyester resin with an unsaturated di-acid as mentioned herein.

Preferably, the resin in the composition of the invention, is a polyester resin having 2-butenedioic acid ethylenic unsaturations said polyester resin is obtainable from at least the following monomers: 2-butenedioic acid, terephthalic acid, neopentylglycol and/or propylene glycol. To obtain branched polyesters trifunctional monomers such as trimethylolpropane may be used. Besides 2-butenedioic acid ethylenic unsaturations, the polyester resin may of course also have other di-acid ethylenic unsaturations.

Preferably, the polyester resin having 2-butenedioic acid ethylenic unsaturations has an acid value in the range from 0 to 250, for example from 0 to 60 mg KOH/g of said polyester resin. The hydroxyl value of the polyester resin having 2-butenedioic acid ethylenic unsaturations is usually in the range of from 0 to 70 mg KOH per g polyester resin, for example in the range of from 10 to 70 mg KOH/g of said polyester resin.

In one embodiment of the invention, the polyester resin having 2-butenedioic acid ethylenic unsaturations has an acid value of at least 10 mg KOH/g of said polyester resin, preferably the acid value is at most 50 mg KOH/g of said polyester resin. This is advantageous as this usually results in a better adhesion to a metal substrate of a powder coating formed by a composition of the invention comprising said polyester resin.

The polyester resin having 2-butenedioic acid ethylenic unsaturations may be crystalline or amorphous.

The crystallinity in a polymer, for example resin, especially for example for a polyester resin, may be introduced by using one or more of the following diacids: succinic acid, adipic acid, sebasic acid or dodecanedioc acid, and/or one or more of the following diols: ethyleneglycol, hexanediol, butanediol in the synthesis.

In case the polyester resin having 2-butenedioic acid ethylenic unsaturations is amorphous, the polyester resin preferably has a glass transition temperature (Tg) of at least 20° C., for example a Tg of at least 25° C., more preferably at least 40° C., even more preferably at least 45° C. and/or a Tg of at most 65° C., preferably at most 60° C., for example at most 55° C., for example at most 50° C.

In case the polyester resin having 2-butenedioic acid ethylenic unsaturations is amorphous, the Mn of the polyester resin may for example be in the range of 2,200 Da to 20,000 Da. Preferably, the Mn of the polyester resin is at most 15,000 Da, preferably at most 8,000 Da, more preferably at most 5,000 Da.

In case the polyester resin having 2-butenedioic acid ethylenic unsaturations is amorphous, the theoretical WPU of the polyester resin having 2-butenedioic acid ethylenic unsaturations is preferably at least 250, more preferably at least 350, for example at least 400 g/mol. Preferably, the theoretical WPU of the amorphous polyester resin having 2-butenedioic acid ethylenic unsaturations is at most 850, more preferably at most 800, even more preferably at most 750, most preferably at most 725 g/mol.

In case the polyester resin having 2-butenedioic acid ethylenic unsaturations is crystalline, the polyester resin preferably has a melting temperature ($T_m$) of at least 30° C., for example a melting temperature of at least 40° C. Preferably, the $T_m$ of the crystalline component is not more than 200° C., more preferably not more than 180° C., even more preferably not more than 160° C., even more preferably not more than 140° C., most preferably not more than 120° C.

In case the polyester resin having 2-butenedioic acid ethylenic unsaturations is crystalline, the theoretical WPU of the polyester resin having 2-butenedioic acid ethylenic unsaturations is preferably at least 250, more preferably at least 350, for example at least 400 g/mol. Preferably, the theoretical WPU of the crystalline polyester resin 2-butenedioic acid ethylenic unsaturations is at most 2000, more preferably at most 1600, even more preferably at most 1400, most preferably at most 1200, especially at most 1000, more especially at most 850, even more especially at most 800 g/mol, most especially at most 750 g/mol, for example at most 725 g/mol.

Preferably, the theoretical WPU of the amorphous and crystalline polyester resins having 2-butenedioic acid ethylenic unsaturations is less than 2,500 g/mol.

In case the composition of the invention comprises a polyester resin having di-acid ethylenic unsaturations, said polyester resin being amorphous or crystalline, then its Mn, WPU, are as exemplified for the crystalline polyester resin having 2-butenedioic acid ethylenic unsaturations. In case the composition of the invention comprises a polyester resin having di-acid ethylenic unsaturations, said polyester resin is amorphous then its Tg is as exemplified for the amorphous polyester resin having 2-butenedioic acid ethylenic unsaturations. In case the composition of the invention comprises a polyester resin having di-acid ethylenic unsaturations, said polyester resin is crystalline then its Tm and Tc are as exemplified for the crystalline polyester resin having 2-butenedioic acid ethylenic unsaturations.

In one embodiment of the invention, the composition of the invention may comprise a blend of crystalline and amorphous components. The crystalline component contains all crystalline resins and the amorphous component contains all amorphous resins. Preferably, each of the crystalline and the amorphous component comprises polyester resins, more preferably each of the crystalline and the amorphous component comprises unsaturated polyester resins.

Preferably, each of the crystalline and the amorphous component substantially comprises polyester resins, more preferably each of the crystalline and the amorphous component substantially comprises unsaturated polyester resins.

The crystalline component of the invention may for example comprise the polyester resin having 2-butenedioic acid ethylenic unsaturations. The crystalline component of the invention may also comprise another polymer different than the polyester resin having 2-butenedioic acid ethylenic unsaturations, for example an unsaturated polyester resin having for example itaconic acid and/or itaconic acid anhydride ethylenic unsaturations or an unsaturated polyester resin having di-acid ethylenic unsaturations. The crystalline component of the invention may for example comprise a saturated polymer, for example a saturated polyester resin. Preferably the crystalline component is substantially free of saturated resins and/or saturated polymers.

The amorphous component of the invention may for example comprise the polyester resin having 2-butenedioic acid ethylenic unsaturations. The amorphous component of the invention may also comprise another polymer different than the polyester resin having 2-butenedioic acid ethylenic unsaturations, for example an unsaturated polyester resin having for example itaconic acid and/or itaconic acid anhydride ethylenic unsaturations or an unsaturated polyester resin having di-acid ethylenic unsaturations. The amorphous component of the invention may for example comprise a saturated polymer, for example a saturated polyester resin. Preferably the amorphous component is substantially free of saturated resins and/or saturated polymers.

In case a crosslinking agent is present in the composition of the invention, then depending whether the crosslinking agent is amorphous or crystalline, said crosslinking agent can form part of either the amorphous or the crystalline component of the composition. An example of a crosslinking agent that is crystalline, is a crystalline vinylether.

Preferably, in case the composition of the invention comprises a blend of crystalline and amorphous components, the amount of the crystalline component is preferably at least 7.5, more preferably at least 10, even more preferably at least 15, most preferably at least 17.5, especially at least 20, more especially at least 25 wt % based on the total amount of resins. Preferably the amount of the crystalline component is at most 90, more preferably at most 80, even more preferably at most 75, most preferably at most 70, especially at most 65, more especially at most 60, most especially at most 55, for example at most 50, for example at most 40 wt % based on the total amount of resins.

Consequently, the amount of amorphous component in case the composition of the invention comprises a blend of crystalline and amorphous components, is preferably at least 10, more preferably at least 20, even more preferably at least 25, most preferably at least 30, especially at least 35, more especially at least 40, most especially at least 45, for example at least 50, for example at least 60 wt % based on the total amount of resins. Preferably the amount of the amorphous component is at most 92.5, more preferably at most 90, even more preferably at most 85, most preferably at most 82.5, especially at most 80, more especially at most 75 wt % based on the total amount of resins.

Preferably, the amorphous component comprises a polyester having di-acid ethylenic unsaturations. Preferably the amorphous component comprises a polyester resin having 2-butenedioic acid ethylenic unsaturations. Even more preferably, the amorphous component is the polyester resin having 2-butenedioic acid ethylenic unsaturations. Preferably, the crystalline component comprises a polyester having di-acid ethylenic unsaturations. Preferably the crystalline component comprises a polyester resin having 2-butenedioic acid ethylenic unsaturations. Even more preferably the crystalline component is the polyester resin having 2-butenedioic acid ethylenic unsaturations.

Preferably, the theoretical weight per ethylenic unsaturation of the blended amorphous and crystalline components in the composition of the invention is less than 2,500 g/mol.

The crystallization temperature ($T_c$) of the crystalline component in a blend with other components is lower than its $T_m$. Preferably the $T_c$ of the crystalline component is at least 20° C., for example at least 25° C., for example at least 40° C. Preferably, the $T_c$ of the crystalline component is at most 55° C. lower than its $T_m$.

The amorphous component preferably has a glass transition temperature (Tg) of at least 20° C., for example a Tg of at least 25° C., more preferably at least 40° C., even more preferably at least 45° C. and/or a Tg of at most 65° C., preferably at most 60° C., for example at most 55° C., for example at most 50° C.

Preferably, in case the composition of the invention comprises a blend of crystalline and amorphous components, the Tg of said blend (without the thermal initiation system) is at least 5° C., for example at least 20° C., for example at least 25° C. and/or preferably at most 130° C., for example at most 100° C.

In case the blended amorphous and crystalline components have more than one Tg, the difference between the highest and the lowest Tg is preferably not more than 20, for example not more than 10° C.

In another aspect, the invention provides for a heat-curable powder coating composition as described herein wherein the $$\frac{\Delta Hm_{cryst\cdot resin} - \Delta Hm_{blend} / 0.01 * A}{\Delta Hm_{cryst\cdot resin}} * 100\% \qquad (III)$$

is preferably less than 50%, for example less than 40%, less than 30%, less than 20%.

In the above formula (III), $\Delta Hm_{cryst.resin}$ is the $\Delta Hm$ of the crystalline component as determined using the method described herein; $\Delta Hm_{blend}$ is the $\Delta Hm$ of the blend of the amorphous and the crystalline component as determined using the method described herein; A is the amount of crystalline component in wt % relative to the total amount of resins.

Crosslinking Agent

EP 0636669 B1 teaches that besides a polymer having a degree of unsaturation between about 300 and 1800 gram per mole (g/mol) unsaturated group (WPU), also a crosslinking agent having at least two vinylether or vinylester functional groups per molecule needs to be present. However, it has surprisingly been found that when curing a composition of the invention using heat cure, the presence of such crosslinking agent is not required to obtain a cure to an acceptable degree.

The composition of the invention may be substantially free of a crosslinking agent. A crosslinking agent may be for example a crosslinking agent chosen from the group of allyls, acrylates, methacrylates, vinylesters, vinylethers, vinyl amides, alkyne ethers, alkyne esters, alkyne amides, alkyne amines, propargyl ethers, propargyl esters, itaconates, enamines, thiols and mixtures thereof.

In case a crosslinking agent is present in the composition, then the crosslinking agent may be amorphous or crystalline. An example of an amorphous crosslinking agent is given in the Examples. An example of a crystalline crosslinking agent is Uracross™ P3307. If present in the composition, then preferably the crosslinking agent is non-volatile at the temperatures and pressures used when processing, applying and storing the powder coating composition. More preferably, the crosslinking agent is preferably solid at room temperature. Preferred crosslinking agents according to the invention have an Mn of less than 2,200 Da. More preferably the crosslinking agents according to the invention have an Mn of at least 200 and less than 2,200 Da, even more preferably of at least 400 and less than 2,200 Da. If present a crosslinking agent is present in the composition of the invention then the preferred crosslinking agent is vinylester or vinylether.

In case, the crosslinking agent is a vinylester or a vinylether, the acid value of the polyester having 2-butenedioic acid ethylenic unsaturations is preferably less than 5 mg KOH per g polyester, more preferably less than 2 mg KOH per g polyester. In case the crosslinking agent in the composition of the invention is different from a vinylether and a vinylester, then the polyester having 2-butenedioic acid ethylenic unsaturations may preferably have a higher acid value (for example of 10 mg KOH/g polyester). These preferred combinations of features may result in a powder coating having a better adhesion, especially to metal substrates.

If a crosslinking agent is present in the composition, the theoretical weight per unsaturation of the crosslinking agent is at most 1,100 g/mole, preferably at most 870 g/mole, for example at most 680 g/mole, for example at most 650 g/mole, for example at most 630 g/mole and/or preferably at least 70, more preferably at least 100, for example at least 150 g/mole.

Thermal Initiation System of the Composition

The thermal initiation system of the composition comprises at least a peroxide (a) which is chosen from the group of peresters and monopercarbonates according to formula (I) and peranhydrides of formula (II) and/or combinations thereof, optionally other thermal radical initiator such as for example perether, hydroperoxides, perketal and/or dipercarbonate in addition to said peroxide, optionally a catalyst (commonly known in the art as accelerator) (b) for the peroxide, optionally an inhibitor (c) for the peroxide.

The peroxides of formulae (I) and (II) and the perethers, hydroperoxides, perketals and dipercarbonates are thermal radical initiators.

Upon heating, the peroxide in the thermal initiation system, generates (free) radicals able to initiate radical crosslinking in the composition of the invention.

As "the peroxide" is understood herein the peroxide chosen from the group of peresters and monopercarbonates according to formula (I) and peranhydrides of formula (II) and/or combinations thereof.

a. Peroxide

The composition of the invention comprises at least a peroxide which is chosen from the from the group of peresters and monopercarbonates according to formula (I)

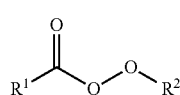

(I)

wherein $R^1$ represents an optionally substituted $C_{1-20}$alkyl, a $C_{6-20}$aryl or for $OR^5$, wherein $R^5$ represents an optionally substituted $C_{1-20}$alkyl or for an optionally substituted $C_{6-20}$aryl; $R^2$ represents an optionally substituted $C_{1-20}$alkyl or for an optionally substituted $C_{6-20}$aryl;

and peranhydrides of formula (II)

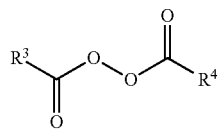

(II)

wherein $R^3$ and $R^4$ each independently stand for an optionally substituted $C_{1-20}$alkyl, a $C_{6-20}$aryl or for $OR^6$, wherein $R^6$ represents an optionally substituted $C_{1-10}$alkyl or a$C_{6-20}$aryl; and any combination of peroxides according to formula (I) and formula (II).

Preferably $R^2$ in formula (I) represents tert-butyl.

Examples of peresters and monopercarbonates according to formula (I) include peresters, for example tert-butyl peroxybenzoate (Trigonox C), tert-butyl peroxyacetate (Trigonox F-050), tert-amyl peroxybenzoate (Trigonox 127), tert-amyl peroxyacetate (Trigonox 133-CK60), tert-butyl-2-ethylhexanoate (Trigonox 21S), tert-butylperoxydiethylacetate (Trigonox 27), di-tert-butylperoxypivalate (Trigonox 25-C75), tert-butyl peroxyneoheptanoate (Trigonox 257-C75), cumylperoxyneodecanoate (Trigonox 99-C75), 2-ethylhexyl perlaurate or mixtures thereof; and monopercarbonates, for example tert-butyl peroxy-2-ethylhexylcarbonate (Trigonox 117), tert-butyl peroxyisopropylcarbonate (Trigonox BPIC75), tert-amylperoxy-2-ethylhexylcarbonate (Trigonox 131) and mixtures thereof.

Preferably, a perester is used, for example tert-butyl peresters, for example tert-butyl peroxybenzoate (Trigonox C) [$R^1$ represents phenyl and $R^2$ represents t-butyl in formula (I)].

Examples of peranhydrides of formula (II) include for example dibenzoylperoxide, dilauroylperoxide, didecanoylperoxide (Perkadox SE-10), di(3,5,5-trimethylhexanoyl)peroxide (Trigonox 36-C75) and mixtures thereof. It should be noted that Trigonox, and Perkadox are trademarks of Akzo Nobel.

Preferably, as a peranhydride dibenzoylperoxide ($R^3$ and $R^4$ in formula (II) both stand for phenyl) or dilauroylperoxide ($R^3$ and $R^4$ in formula (II) both stand for undecane) is present in the composition of the invention.

The terms 'optional substituent' and/or 'optionally substituted' as used herein (unless followed by a list of other substituents) signifies one or more of an 'organic group'. The term 'organic substituent' as used herein denotes any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur. Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The composition of the invention may comprise also other thermal radical initiators besides the peresters and/or monopercarbonates of formula (I) and/or peranhydrides of formula (II), such as for example perethers, hydroperoxides, perketals, dipercarbonates or azo compounds.

Preferably the peroxide is chosen from the group of peresters and monopercarbonates according to formula (I) and peranhydrides of formula (II) and/or any combination of peroxides according to formula (I) and formula (II) thereof.

More preferably the peroxide is chosen from the group of peresters and monocarbonates according to formula (I).

The amount of peroxide in the composition of the invention is at least 0.65, preferably at least 0.7, more preferably at least 0.75, even more preferably at least 0.8, most preferably at least 0.9, especially 1, more especially at least 1.2, even more especially at least 1.5, most especially at least 2 wt % on the total amount of resins. The amount of peroxide is preferably less than 10, more preferably less than 8, even more preferably less than 7, most preferably less than 6 wt % on total amount of resins.

An alternative method to calculate the amount of peroxide in the composition of the invention is based on the weight of peroxide calculated on the total weight of resins normalized to 100 parts of resins. According to this method, the amount of peroxide is at least 0.65, preferably at least 0.7, more preferably at least 0.75, even more preferably at least 0.8, most preferably at least 0.9, especially 1, more especially at least 1.2, even more especially at least 1.5, most especially at least 2 pph. The amount of peroxide is preferably less than 10, more preferably less than 8, even more preferably less than 7, most preferably less than 6 pph.

b. Catalyst (Accelerator)

The composition of the invention may also comprise a catalyst also indicated herein as accelerator, for the thermal radical initiator for example the peroxide. An accelerator may for example be a transition metal compound.

Therefore, the invention also relates to a composition of the invention of the invention, wherein the initiation system comprises a peroxide according to formula (I) and a transition metal compound.

The accelerator may be chosen from the group of transition metal compounds of transition metals with atomic numbers from/equal to 21 and up to/equal to 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of suitable transition metal compounds are those of the following transition metals Sc, Ti, V, Cr, Mn, Fe, Co, Ni, Cu, Zn, Mo, W, etc., preferably Mn, Fe, Co or Cu.

The transition metal compounds are preferably chosen from the group of transition metal salts or complexes or mixtures thereof, preferably from the group of organic metal salts or complexes, most preferably organic acid metal salts or derivatives thereof, for example transition metal carboxylates or transition metal acetoacetates, for example transition metal ethylhexanoate. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

The optimal amount of transition metal catalyst is dependent on the choice of transition metal catalyst and of the peroxide, but can easily be determined by the person skilled in the art through routine experimentation. Generally, the amount of transition metal catalyst may be chosen in the range of from 0.00001 to 25 mmol transition metal catalyst/kg total amount of resins.

The amount of thermal radical initiator for example the amount of the peroxide and the catalyst for the thermal radical initiator used, is preferably chosen such that when the composition of the invention cures to an acceptable degree at low temperatures.

c. Inhibitor

The composition of the invention may further comprise an inhibitor for the peroxide and any other thermal radical initiator optionally present in the composition of the invention.

Examples of inhibitors are preferably chosen from the group of phenolic compounds, stable radicals, catechols, phenothiazines, hydroquinones, benzoquinones or mixtures thereof.

Examples of phenolic compounds include 2-methoxyphenol, 4-methoxyphenol, 2,6-di-t-butyl-4-methylphenol, 2,6-di-t-butyl-phenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-tolyloxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

It is also possible to use a mixture of (the above mentioned) inhibitors. Preferably as an inhibitor hydroquinones or catechols are used, depending on the choice of (type and amount of) transition metal compound, more preferably the inhibitor is a hydroquinone.

In another embodiment, the invention provides for a composition of the invention, wherein the inhibitor is a hydroquinone.

1 k and/or 2 k Compositions

The compositions of the invention may be a one component system, but may also be a two component system. Preferably, the composition of the invention is one component system.

With a 'one component system', also called a 1K system, is meant that all (reactive) components of the powder coating composition form part of one powder. In a two component system, also called 2K system, a powder coating composition is composed of at least two different powders with different chemical compositions, which keeps the reactive components physically separated. The at least two different powders may be mixed in a physical blend before the composition of the invention is put in the storage container or may be mixed just before applying the 2K system to a substrate to let a curing reaction take place. The compositions of the at least two different powders in the 2K system are usually selected such that each powder contains an ingredient which is needed for curing but is absent from the other powder(s). This separation allows preparation of the individual powder composition in a heated state (such as by melt mixing) without the initiation of the cure reaction.

The composition of the invention may optionally comprise the usual additives, such as for example waxes, pigments, fillers degassing agents, flow (smothness) agents, appearance enhancing agents or (light) stabilizers. It should be noted that none of these usual additives are considered to be transition metal compounds. The pigments may be inorganic or organic. Suitable inorganic pigments include for example, titanium dioxide, zinc sulphide, zinc phosphate, mica, iron oxide and for chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Examples of flow agents include Byk™ 361 N. Other additives, such as additives for improving tribo-chargeability may also be added.

Nucleating agents may also be present in the composition of the invention in order to facilitate the crystallization of the crystalline component in the blend.

Any feature or preferred combination of features or preferred combination of ranges disclosed in the invention and regard the composition of the invention for example resins, blends of resins, thermal initiation system, crosslinking agent, can be combined.

Methods of: a) Preparation of the Composition of the Invention and b) Coating a Substrate with a Composition of the Invention A common way to prepare a powder coating composition is to mix the separately weighed-out components in a premixer, heat the obtained premix, for example in a kneader, preferably in an extruder to obtain an extrudate, cool down the obtained extrudate until it solidifies and crush it into granules or flakes that are further ground to reduce the particle size followed by appropriate classification to obtain a powder coating composition of the right particle size.

Therefore the invention also relates to a process for the preparation of a heat-curable powder coating composition as defined herein comprising the steps of:
  a. mixing the components of the heat-curable powder coating composition to obtain a premix;
  b. heating the premix, preferably in an extruder, to obtain an extrudate;
  c. cooling down the extrudate to obtain a solidified extrudate; and
  d. grinding the solidified extrudate into smaller particles to obtain the heat-curable powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the composition of the invention in the extruder.

In another aspect, the invention relates to a process for coating a substrate comprising the steps of:
  a. applying a heat-curable powder coating composition as defined herein, to a substrate;
  b. heating the substrate.

The composition of the invention may be applied using the techniques known to the person skilled in the art, for example using electrostatic spray or electrostatic fluidized bed or flame spray.

Heating of the coated substrate may be done using conventional methods, such as with a convection oven and/or with an (N)IR lamp. Even microwave equipment may be used to heat the substrate.

The time during which the composition of the invention is at least partially cured is preferably below 60 minutes and usually above 1 minute in case a convection oven is used to heat the coating. More preferably, the curing time is below 40 minutes, even more preferably is at most 30 minutes, most preferably is at most 20 minutes, especially is at most 10 minutes.

The temperature, at which the composition of the invention is cured, is preferably in the range of 60 to 225° C., more preferably in the range 60 to 130° C., even more preferably 80 to 120° C. Preferably, the curing temperature is lower than 130° C., more preferably lower than 120° C., even more preferably lower than 110° C., most preferably lower than 100° C., most preferably lower than 95° C. Preferably, the curing temperature is at least 65° C., more preferably 70° C., even more preferably at least 75° C.

For example, the curing time and curing temperature of a composition of the invention may be 20 minutes at 130° C., preferably 10 minutes at 130° C.

Other Embodiments and Aspects of the Invention

In another aspect, the invention relates to the use of a composition according to the invention to coat a substrate or an article.

In another aspect, the invention relates to the use of a composition according to the invention to fully or partially coat a substrate.

In another embodiment the invention relates to the use of a composition of the invention to coat a heat-sensitive substrate, preferably wood for example low density fibre board, medium density fibreboard and high density fibreboard, plastic, etc., or combinations thereof.

In another aspect, the invention relates to a substrate that is fully or partially coated with the composition of the invention.

In another aspect, the invention relates to a substrate that is fully or partially coated with a coating prepared from the composition of the invention.

In one embodiment of the invention the substrate is a non heat-sensitive substrate, for example glass, ceramic, fibre cement board, or metal, for example aluminum, copper or steel, preferably metal.

In another embodiment of the invention, the substrate is a heat-sensitive substrate.

In yet another embodiment, the invention provides for a use of the composition of the invention to coat a heat-sensitive substrate and/or a non heat-sensitive substrate.

In yet another embodiment, the invention provides for a use of the composition of the invention to coat a substrate wherein the substrate is a heat-sensitive substrate, for example wood or plastic or wherein the substrate is a non-heat sensitive substrate, for example metal.

Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates. Examples of plastic substrates include unsaturated polyester resin based compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS.

Other heat-sensitive substrates include objects that are a combination of a metal substrate with a heat-sensitive part, such as plastic hosing, heavy metal parts, strips, for example aluminium frames with heat strips etc.

Other substrates that are particularly suitable for coating with the powder coating of the invention are those where a low temperature cure is desired for efficient production, such as heavy metal parts.

Specific wood coating markets where the composition of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where the composition of the invention may be used include automotive applications, such as interior car parts, wheel covers, bumpers, under the hood parts etc, flexible flooring, sporting goods, cosmetics, audio-visual applications, such as TV sets, computer housing, phones, etc., household appliances and satellite dishes.

In yet another embodiment, the invention provides for a heat-curable powder coating composition, wherein the powder coating composition comprises a blend of (semi)crystalline and amorphous components.

In another embodiment the invention provides for a heat-curable powder coating composition comprising an unsaturated resin and an thermal initiation system, wherein the unsaturated resin is a polyester having fumaric acid based unsaturations wherein the theoretical weight per unsaturation of the unsaturated resin is at most 850 g/mol resin wherein the thermal initiation system comprises a peroxide which is chosen from the group of peresters and monopercarbonates according to formula (I)

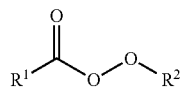

(I)

wherein $R^1$ represents an optionally substituted $C_{1-20}$alkyl, a $C_{6-20}$aryl or for $OR^5$, wherein $R^5$ represents an optionally substituted $C_{1-20}$alkyl or for an optionally substituted $C_{6-20}$aryl; $R^2$ represents an optionally substituted $C_{1-20}$alkyl or for an optionally substituted $C_{6-20}$aryl; and peranhydrides of formula (II)

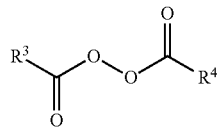

(II)

wherein $R^3$ and $R^4$ each independently stand for an optionally substituted $C_{1-20}$alkyl, a $C_{6-20}$aryl or for $OR^6$, wherein $R^6$ represents an optionally substituted $C_{1-10}$alkyl or a $C_{6-20}$aryl and any combinations thereof; wherein the amount of peroxide is at least 0.8 wt % based on the total amount of resins.

In a another embodiment the invention provides for a heat-curable powder coating composition, wherein the polyester having fumaric acid based unsaturations has an acid value of at least 10 mg KOH/g polyester.

Many other variations embodiments of the invention will be apparent to those skilled in the art and such variations are contemplated within the broad scope of the present invention.

All embodiments disclosed herein may be combined with each other and/or with preferred elements of the present invention.

Further aspects of the invention and preferred features thereof are given in the claims herein.

The invention will now be described in detail with reference to the following non limiting examples which are by way of illustration only.

EXAMPLES

In the Examples section, the abbreviation PE represents polyester resin, the abbreviation PCC represents powder coating composition and the abbreviation PC represents powder coating.

In the Examples section the abbreviation "Comp" denotes a Comparative Example of either a powder coating composition e.g. CompPCC1, or a powder coating e.g. CompPC1.

In Tables 3-6, the abbreviation "n.m." denotes "not measured".

In Tables 6, the abbreviation "n.p.e" denotes "not possible to extrude".

Analytical Methods and Techniques for the Measurement of the Properties of the Polyesters Resins Used in the Heat-Curable Powder Coating Compositions The glass transition temperature ($T_g$) (inflection point), of the crystallization temperature ($T_c$), the melting temperature ($T_m$) and the melting enthalphy ($\Delta H_m$) were measured via Differential Scanning calorimetry (DSC) on a Mettler Toledo, TA DSC821 apparatus, in $N_2$ atmosphere as described herein after: A sample of 10 mg was placed in the DSC apparatus. The sample was brought to 25° C. In the first heating curve, the sample was heated to 150° C. with a heating rate of 5° C./min. The sample was kept at 150° C. for 1 min. The sample was subsequently cooled to −50° C. with a cooling rate of 5° C./min, resulting in a cooling curve. After reaching −50° C. the sample was immediately heated to 150° C. with a heating rate of 5° C./min, affording a second heating curve. The $T_g$ was measured from the cooling curve (150° C. to −50° C., cooling rate 5° C./min) whereas the Tg, $T_n$, and $\Delta H_m$ were determined from the second heating curve (−50° C. to 150° C., heating rate of 5° C./min).

Unless otherwise stated the theoretical number average molecular weight ($M_n$) is defined as follows:

$$M_n = (\Sigma_i N_i M_i)/(\Sigma_i N_i)$$

where $N_i$ is the number of molecules of molecular weight $M_i$.

The $M_n$ is calculated (theoretical value) by multiplying the targeted functionality (f) with 56110 and dividing the outcome thereof by the sum of the targeted acid value (AV) (mg KOH/g of the polyester) and the targeted hydroxyl value (OHV) (mg KOH/g of the polyester) according to the following equation:

$$M_n = (56110 \times f)/(AV + OHV)$$

The Mn can also be measured (measured Mn), for example by determining the molecular weight (Mn) in tetrahydrofurane using GPC according to ISO 13885-1 employing polystyrene standards and appropriate columns designed for the determination of the molecular weights.

Viscosity measurements were carried out at 160° C., on a Rheometric Scientific CT 5 (Rm 265) apparatus (Mettler Toledo). A 30 mm spindle was used. The applied shear-rate was 70 s$^{-1}$.

The acid and hydroxyl values of the polyester resins were determined titrimetrically according to ISO 2114-2000 and ISO 4629-1978, respectively or were determined theoretically.

The weight per ethylenic unsaturation was also determined via $^1$H-NMR on a 300 MHz Varian NMR-spectrometer using pyrazine as internal standard (measured WPU). Recorded spectra were analyzed in full with ACD software and peak areas of all peaks were calculated.

The weight resin per mole unsaturation was calculated with the following formula:

$$WPU = \left[ \frac{W_{pyr}}{W_{resin}} \frac{1}{MW_{pyr}} \frac{A_{c=c}/N_{c=c}}{A_{pyr}/N_{pyr}} \right]^{-1}$$

$W_{pyr}$ and $W_{resin}$ are weights pyrazine (is internal standard) and resin, respectively, expressed in the same units. $MW_{pyr}$ is molecular weight pyrazine (=80 gr/mole). $A_{C=C}$ is the peak area for hydrogens attached to the carbon carbon double bonds of the reactive unsaturations (C═C component) in the resin; $N_{C=C}$ is the number of hydrogens of that particular C═C component. $A_{pyr}$ is the peak area for pyrazine and $N_{pyr}$ is the number of hydrogens (=4).

Methods for the Measurement of Properties of the Powder Coatings Derived Upon Heat-Curing of the Heat-Curable Powder Coating Compositions Prepared Herein.

The properties of the powder coatings of the powder coatings corresponding to the heat-curable compositions presented in Table 3 were measured on panels cured for 20 minutes.

The properties of the powder coatings of the powder coatings corresponding to the heat-curable compositions presented in Tables 4-6 were measured on panels cured for 10 minutes.

The minimum depth (mm) of indentation to cause failure [commonly known also as Erichsen Slow Penetration (ESP)] was determined according to ISO 1520:2006 (Cupping Test, especially §7.3), 24 hours after curing the panels with the heat-curable powder coating compositions as described herein. The minimum depth of indentation to cause failure was determined for coated panels cured at 130° C. ISO 1520:2006 specifies an empirical test procedure for assessing the resistance of a coating to cracking and/or detachment from a metal substrate when subjected to gradual deformation by indentation under standard conditions. The method was carried out by gradually increasing the depth of indentation to determine the minimum depth (mm) at which the coating cracks and/or becomes detached from the substrate. The maximum of two valid measurements of the minimum depth of indentation to cause failure was reported.

The adhesion was determined using a cross-cut test ('Gitterschnitt') in accordance with ISO 2409 (edition 3, dated 15 May 2007) at 130° C. The degree of adhesion of the coating onto the substrate was classified with a scale from G0 to G5; with G0: cross-cut area was not affected (excellent adhesion); G1 means that the affected cross-cut area is significantly greater than 5%; G2 means that the affected cross-cut area is significantly greater than 5% but not significantly greater than 15%; G3 means that the affected cross-cut area is significantly greater than 15% but not significantly greater than 35%; G4 means that the affected cross-cut area is significantly greater than 35% but not significantly greater than 65%; G5 means any degree of flaking that cannot even be classified by classification G4 (very poor adhesion). For the heat-curable powder coating compositions of the invention, their corresponding powder coatings presenting adhesion ranging from G0 to G3. More preferred powder coatings have adhesion ranging from G0 to G2.

Acetone double rubs (ADR) were carried out as described herein to determine the curing. For the purpose of the invention with one acetone double rub (ADR) is meant one back and forward movement over the surface of a coating having a thickness of approximately 60 µm using a cotton cloth drenched in acetone, which cotton cloth covers a hammer head having a weight of 980 gram and a contact surface area with the coating of 2 cm$^2$. Every 20 rubs the cloth is drenched in acetone. The measurement is continued until either the coating is removed (and the obtained ADR number and curing temperature are noted down) or until 100 ADR are reached. In the context of the invention, the measurement was carried out on panels cured at various curing temperatures for example at curing temperatures in the range of 80-180° C. with an increment of 10° C. The lower curing temperature at which 100 ADR were reached was reported herein. In certain cases, the coating was completely removed at the tested curing temperatures; therefore no specific temperature was reported. In the context of the invention, by "cure to an acceptable degree at low temperatures" is meant that the powder coating when cured at most 130° C. for at most 20 minutes, is able to resist at least 100 acetone double rubs (ADR). The curing temperature (in ° C.) at which the powder coating composition can withstand at least 100 ADR was reported (temperature for 100 ADR).

The coating thickness was measured by a PosiTector 6000 coating thickness gage from DeFelsko Corporation.

Unsaturated Polyester Resins

The monomers used for the preparation of the unsaturated polyester resins are presented in Table 1. Table 1 presents also the properties of the prepared unsaturated polyester resins.

Synthesis of Amorphous Polyester Resins Having 2-Butenedioic Acid Ethylenic Unsaturations (PE1-PE12)

Polyester Resins PE1, PE2 and PE7

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 205° C. When an acid value of less than approximately 15 mg KOH/g resin was reached, the third stage of the polyester preparation was carried out under reduced pressure at 205° C. till an acid value of approximately 5 mg KOH/g resin was reached. The acid value of the resin was brought below 5 mg KOH/g resin via reaction of the remaining acid-groups of the resin with 2,3-epoxy propyl neodecanoate (PE 2 and PE7) or ethylene carbonate (PE1). The used amount was dependent on the acid value before addition. Subsequently, the polyester was discharged onto an aluminum foil kept at room temperature.

Polyester Resins PE3, PE4, PE5, PE6 and PE10

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 240° C. Subsequently, for the second step fumaric acid together with a small amount of radical inhibitor was added at a temperature of 170° C. followed by esterification at 205° C. When an acid value of less than approximately 65 mg KOH/g resin was reached, the third stage of the polyester preparation was carried out under reduced pressure at 205° C. till an acid value of approximately 45 mg KOH/g resin was reached. Subsequently, the polyester was discharged onto an aluminum foil kept at room temperature.

Polyester Resin PE8

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 230° C. Subsequently, for the second step fumaric acid together with a small amount of radical inhibitor was added at a temperature of 180° C. followed by esterification at 205° C. When an acid value of less than approximately 40 mg KOH/g resin was reached, the third stage of the polyester preparation was carried out under reduced pressure at 205° C. till an acid value of approximately 30 mg KOH/g resin was reached. Subsequently, the polyester was discharged onto an aluminum foil kept at room temperature.

Polyester Resin PE9

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 230° C. Subsequently, for the second step fumaric acid together with a small amount of radical inhibitor was added at a temperature of 180° C. followed by esterification at 205° C. When an acid value of less than approximately 55 mg KOH/g resin was reached, the third stage of the polyester preparation was carried out under reduced pressure at 205° C. till an acid value of approximately 45 mg KOH/g resin was reached. Subsequently, the polyester was discharged onto an aluminum foil kept at room temperature.

Polyester Resin PE11

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 220° C. Subsequently, for the second step benzoic acid and fumaric acid together with a small amount of radical inhibitor was added at a temperature of 160° C. followed by esterification at 220° C. When an acid value of less than approximately 30 mg KOH/g resin was reached, the third stage of the polyester preparation was carried out under reduced pressure at 200° C. till an acid value of approximately 5 mg KOH/g resin was reached. The acid value of the resin was brought below 3.5 mg KOH/g resin via reaction of the remaining acid-groups of the resin with ethylene carbonate. The used amount was dependent on the acid value before addition. Subsequently, the polyester was discharged onto an aluminum foil kept at room temperature.

Polyester Resin PE12

A reaction vessel fitted with a thermometer, a stirrer and a distillation device, was filled with a tin catalyst and the monomers for the first step (all the (poly)alcohols and terephthalic acid) as listed in Table 1. Stirring was then applied and a light nitrogen flow was passed over the reaction mixture while the temperature was raised to 225° C. Subsequently, for the second step fumaric acid together with a small amount of radical inhibitor was added at a temperature of 180° C. followed by esterification at 200° C. When an acid value of less than approximately 35 mg KOH/g resin was reached, the third stage of the polyester preparation was carried out under reduced pressure at 205° C. till an acid value of approximately 25 mg KOH/g resin was reached. Subsequently, the polyester was discharged onto an aluminum foil kept at room temperature.

Synthesis of Crystalline Polyester Resins Having 2-Butenedioic Acid Ethylenic Unsaturations (PE13-PE14 and PE17-PE20) or Itaconic Acid Ethylenic Unsaturations (PE16) or 2-Butenedioic Acid and Itaconic Acid Ethylenic Unsaturations (PE15) Polyester Resin PE13, PE14, PE15, PE18, PE19 and PE20

A reaction vessel fitted with a thermometer, a stirrer and a distillation device, was filled with a tin catalyst and the monomers for the first step (the alcohol and acid) as listed in Table 1. Stirring was then applied and a light nitrogen flow was passed over the reaction mixture while the temperature was raised to 200° C. Subsequently, for the second step the unsaturated acid(s) together with a small amount of radical inhibitor was added at a temperature of 160° C. followed by esterification at 205° C. When an acid value of less than approximately 40 mg KOH/g resin was reached, the third stage of the polyester preparation was carried out under reduced pressure at 205° C. till an acid value of approximately 30 mg KOH/g resin was reached. Subsequently, the polyester was discharged onto an aluminum foil kept at room temperature.

Polyester Resin PE16 and PE17

A reaction vessel fitted with a thermometer, a stirrer and a distillation device, was filled with a tin catalyst and the monomers for the first step (the alcohol and acid) as listed in Table 1. Stirring was then applied and a light nitrogen flow was passed over the reaction mixture while the temperature was raised to 200° C. Subsequently, for the second step the unsaturated acid(s) together with a small amount of radical inhibitor was added at a temperature of 160° C. followed by esterification at 200° C. When an acid value of less than approximately 10 mg KOH/g resin was reached, the third stage of the polyester preparation was carried out under reduced pressure at 205° C. till an acid value of approximately 5 mg KOH/g resin was reached. Subsequently, the polyester was discharged onto an aluminum foil kept at room temperature.

All the polyester resins PE1-PE20 were solid at room temperature and at atmospheric pressure.

Preparation of Heat-Curable Powder Coating Compositions: General Procedure

The compositions of the heat-curable powder coating compositions are presented in Tables 3-6. The thermal radical initiators for example peroxides, the accelarators, the inhibitors and the pigments used for the preparation of the heat-curable powder coating compositions are presented in Table 2. Kronos® 2160 is titanium dioxide from Kronos Titan GmbH, Resiflow® PV-5 is a flow control agent from Worlée-Chemie GmbH.

The heat-curable compositions were prepared by mixing the components presented in Tables 3-6 in a blender. Subsequently, the components were extruded in a PRISM TSE16 PC twin screw extruder at 60° C. with a screw speed of 200 rpm and a torque higher than 90%. The extrudate was allowed to cool to room temperature and broken into chips. These chips were then ground in an ultra-centrifugal mill at 18,000 rpm and sieved in a Retsch ZM100 sieve. The sieve fraction with particle size below 90 µm was collected and used for further experiments.

All heat-curable powder coating compositions prepared herein were solid at 23° C. and at atmospheric pressure.

Preparation of the Powder Coatings: General Procedure

The heat-curable powder coating compositions prepared herein were electrostatically sprayed (corona spray gun, 60 kV) onto ALQ test panels to a coating thickness upon curing of approximately 60 µm and cured at various temperatures ranging from 80 to 180° C. for either 10 or 20 minutes in an air-circulation oven (Heraeus Instruments UT6120) affording white colored powder coatings.

TABLE 1

Composition and characterization of polyester resins

| | Polyester resin | Polyester resin composition [monomer in mol %] | | | | | | | | | Polyester resin characterization |
|---|---|---|---|---|---|---|---|---|---|---|---|
| | | Propylene glycol | Neopentylglycol | 1,4-Butanediol | Trimethylol propane | Terephthalic acid | Benzoic acid | Succinic anhydride | Fumaric acid | Itaconic acid | Theoretical WPU |
| AMORPHOUS | PE1 | | 47.9 | | 3.7 | 37.5 | | | 10.9 | | 1028 |
| | PE2 | 48.2 | | | 3.4 | 38.5 | | | 9.9 | | 1000 |
| | PE3 | | 47.2 | | 0.5 | 40.1 | | | 12.3 | | 920 |
| | PE4 | | 47.4 | | 0.5 | 39.2 | | | 13.0 | | 875 |
| | PE5 | | 47.2 | | 0.5 | 38.0 | | | 14.4 | | 775 |
| | PE6 | | 47.2 | | 0.5 | 37.1 | | | 15.2 | | 725 |
| | PE7 | 50.7 | | | 0.4 | 35.4 | | | 13.6 | | 725 |
| | PE8 | | 47.8 | | 0.5 | 36.7 | | | 14.9 | | 655 |
| | PE9 | | 47.2 | | 0.5 | 37.3 | | | 15.0 | | 652 |
| | PE10 | | 47.5 | | 0.4 | 30.6 | | | 21.6 | | 500 |
| | PE11 | 46.9 | | | 1.4 | 25.6 | 6.9 | | 19.1 | | 500 |
| | PE12 | 47.5 | | | 1.9 | 27.5 | | | 23.1 | | 500 |
| CRYSTALINE | PE13 | | | 48.9 | | | | 32.6 | 18.5 | | 500 |
| | PE14 | | | 49.0 | | | | 33.7 | 17.4 | | 500 |
| | PE15 | | | 48.9 | | | | 40.4 | 5.4 | 5.4 | 653 |
| | PE16 | | | 51.1 | | | | 38.9 | | 10.0 | 711 |
| | PE17 | | | 50.2 | | | | 39.8 | 10.0 | | 711 |
| | PE18 | | | 49.0 | | | | 40.2 | 10.9 | | 800 |
| | PE19 | | | 49.0 | | | | 41.4 | 9.7 | | 900 |
| | PE20 | | | 49.0 | | | | 42.3 | 8.7 | | 1000 |

| | Polyester resin | Polyester resin characterization | | | | | | | | |
|---|---|---|---|---|---|---|---|---|---|---|
| | | Theoretical Mn | Theoretical functionality (f) | Targeted hydroxyl value (mg KOH/g) | Targeted acid value (mg KOH/g) | Measured hydroxyl value (mg KOH/g) | Measured acid value (mg KOH/g) | Tg (° C.) | Tm (° C.) | Tc (° C.) | ΔHm (J/g) |
| AMORPHOUS | PE1 | 2723 | 2.9 | 56.0 | 3.5 | 42.7 | 3.1 | 46.5 | | | |
| | PE2 | 2521 | 2.9 | 60.1 | 3.5 | 53.2 | 1.5 | 51.9 | | | |
| | PE3 | 2357 | 2.1 | 5.0 | 45.0 | 5.2 | 47.6 | 58.0 | | | |
| | PE4 | 2402 | 2.1 | 4.0 | 44.9 | 6.6 | 46.2 | 57.0 | | | |
| | PE5 | 2357 | 2.1 | 5.0 | 45.0 | 6.0 | 47.4 | 56.0 | | | |
| | PE6 | 2357 | 2.1 | 5.0 | 45.0 | 6.2 | 44.7 | 55.0 | | | |
| | PE7 | 3157 | 2.1 | 37.5 | 0.0 | 36.0 | 0.5 | 58.5 | | | |
| | PE8 | 3527 | 2.2 | 5.0 | 30.0 | 4.2 | 31.2 | 58.0 | | | |
| | PE9 | 2357 | 2.1 | 5.0 | 45.0 | 3.4 | 47.7 | 56.0 | | | |
| | PE10 | 2374 | 2.1 | 4.0 | 45.4 | 7.3 | 50.0 | 50.0 | | | |
| | PE11 | 2385 | 0.7 | 13.5 | 3.5 | 13.5 | 3.5 | 40.0 | | | |
| | PE12 | 2744 | 2.6 | 25.0 | 25.0 | 25.1 | 24.3 | 53.0 | | | |
| CRYSTALINE | PE13 | 3741 | 2.0 | 0.0 | 30.0 | | | | 122.0 | 85.0 | 80.0 |
| | PE14 | 3366 | 2.0 | 3.2 | 30.0 | | | | 121.5 | 78.4 | 84.6 |
| | PE15 | 3741 | 2.0 | 0.0 | 30.0 | | | | 108.0 | 66.0 | 71.0 |
| | PE16 | 3741 | 2.0 | 30.0 | 0.0 | | | | 94.0 | 43.0 | 63.0 |
| | PE17 | 3741 | 2.0 | 30.0 | 0.0 | | | | 114.0 | 91.0 | 90.0 |
| | PE18 | 3366 | 2.0 | 3.2 | 30.0 | | | | 118.8 | 79.7 | 86.0 |
| | PE19 | 3366 | 2.0 | 3.2 | 30.0 | | | | 118.7 | 80.7 | 91.0 |
| | PE20 | 3366 | 2.0 | 3.2 | 30.0 | | | | 118.4 | 81.4 | 88.7 |

TABLE 2

Thermal radical initiators, accelarators, inhibitor and pigment used for the preparation of the heat-curable powder coating compositions

| Chemical name | Structure | Commercial name | Description or use |
| --- | --- | --- | --- |
| Tert-butyl peroxybenzoate | | Tigonox ™ C from Akzo Nobel | Thermal radical initiator (peroxide according to formula I) |
| Tert-amyl peroxy (2-ethyl) hexanoate | | Trigonox ™ 121 from AkzoNobel | Thermal radical initiator (peroxide according to formula I) |
| Dilauroyl peroxide | | Laurox ™ S from Akzo Nobel | Thermal radical initiator (peroxide according to formula II) |
| Dibenzoyl peroxide (BPO) | | Luperox ™ A75 from Arkema | Thermal radical initiator (peroxide according to formula II) |
| 2,2-Azodi(isobutyronitriole) (AIBN) | | Perkadox ™ AIBN form Akzo Nobel | Thermal radical initiator (azo compound, not a peroxide according to formula I or formula II) |
| 1,1-Azodi (hexahydrobenzonitrile) | | | Thermal radical initiator (azo compound, not a peroxide according to formula I or formula II) |
| Dicumyl peroxide | | Peradox ™ BC-FF from AkzoNobel | Thermal radical initiator (peroxide but not a peroxide according to formula I or formula II) |
| Tert-butyl hydroperoxide | | Trigonox ™ A-W70 from AkzoNobel | Thermal radical initiator (peroxide but not a peroxide according to formula I or formula II) |
| Cobalt bis(2-ethylhexanoate) | | COMMET ™ Cobalt Octate from De Monchy International B.V. | Accelerator |
| Cobalt stearate | | | Accelerator |
| Tert-butyl hydroquinone | | | Inhibitor |
| Kronos 2160 | | | Pigment |

TABLE 3

Composition of heat-curable powder coating compositions and properties of their corresponding powder coatings

| Heat-curable powder coating composition | Amorphous polyester | Amount of amorphous resin (g) | Crystalline polyester | Amount of crystalline resin (g) | wt % crystalline polyester on total amount of amorphous polyester and crystalline polyester | Tert-butyl perbenzoate (pph) | Dilauryl peroxide (pph) |
|---|---|---|---|---|---|---|---|
| Comp PCC1 | PE11 | 100.0 | | | 0.0 | 2.0 | |
| Comp PCC2 | PE7 | 100.0 | | | 0.0 | 0.8 | |
| Comp PCC3 | PE7 | 100.0 | | | 0.0 | 0.8 | |
| Comp PCC4 | PE7 | 100.0 | | | 0.0 | | 2.4 |
| Comp PCC5 | PE12 | 100.0 | | | 0.0 | 1.6 | |
| Comp PCC6 | PE2 | 100.0 | | | 0.0 | 0.6 | |
| Comp PCC7 | PE2 | 100.0 | | | 0.0 | | 2.4 |
| Comp PCC8 | PE2 | 100.0 | | | 0.0 | | 4.8 |
| Comp PCC9 | PE2 | 100.0 | | | 0.0 | 1.6 | |
| Comp PCC10 | PE7 | 100.0 | | | 0.0 | | |
| Comp PCC11 | PE7 | 100.0 | | | 0.0 | | |
| Comp PCC12 | PE7 | 100.0 | | | 0.0 | | |
| Comp PCC13 | PE7 | 100.0 | | | 0.0 | | |
| Comp PCC14 | PE7 | 100.0 | | | 0.0 | 0.1 | |
| Comp PCC15 | PE8 | 100.0 | | | 0.0 | 1.0 | |
| Comp PCC16 | PE8 | 100.0 | | | 0.0 | 1.0 | |
| Comp PCC17 | PE9 | 100.0 | | | 0.0 | 1.0 | |
| Comp PCC18 | PE1 | 100.0 | | | 0.0 | 0.6 | |
| Comp PCC19 | | | PE13 | 100.0 | 100.0 | 1.8 | |
| PCC1 | PE8 | 75.0 | PE17 | 25.0 | 25.0 | 1.0 | |
| PCC2 | PE8 | 60.0 | PE17 | 40.0 | 40.0 | 1.0 | |
| PCC3 | PE8 | 75.0 | PE16 | 25.0 | 25.0 | 1.0 | |
| PCC4 | PE8 | 60.0 | PE16 | 40.0 | 40.0 | 1.0 | |
| PCC5 | PE8 | 75.0 | PE15 | 25.0 | 25.0 | 1.0 | |

| Heat-curable powder coating composition | 2,2-Azodi(isobutyronitrile) (pph) | 1,1-Azodi(hexahydrobenzonitrile) (pph) | Dicumylperoxide (pph) | t-Butylhydroperoxide (pph) |
|---|---|---|---|---|
| Comp PCC1 | | | | |
| Comp PCC2 | | | | |
| Comp PCC3 | | | | |
| Comp PCC4 | | | | |
| Comp PCC5 | | | | |
| Comp PCC6 | | | | |
| Comp PCC7 | | | | |
| Comp PCC8 | | | | |
| Comp PCC9 | | | | |
| Comp PCC10 | 1.0 | | | |
| Comp PCC11 | | 1.0 | | |
| Comp PCC12 | | | 1.0 | |
| Comp PCC13 | | | | 1.0 |
| Comp PCC14 | | | | |
| Comp PCC15 | | | | |
| Comp PCC16 | | | | |
| Comp PCC17 | | | | |
| Comp PCC18 | | | | |
| Comp PCC19 | | | | |
| PCC1 | | | | |
| PCC2 | | | | |
| PCC3 | | | | |
| PCC4 | | | | |
| PCC5 | | | | |

| Heat-curable powder coating composition | Cobalt bis(2-ethyl hexanoate) (g) | Tert-butyl hydroquinone (g) | Kronos 2160 (g) | Temperature (° C.) for 100 ADR | Minimum depth of indentation to cause failure (mm) | Adhesion (Gitterschnitt) |
|---|---|---|---|---|---|---|
| Comp PCC1 | 0.20 | 0.05 | | 100 | <1 | n.m. |
| Comp PCC2 | 0.18 | 0.05 | | 100 | <1 | n.m. |

TABLE 3-continued

Composition of heat-curable powder coating compositions and properties of their corresponding powder coatings

| | | | | | | |
|---|---|---|---|---|---|---|
| Comp PCC3 | 0.18 | 0.05 | 50.0 | 100 | <1 | n.m. |
| Comp PCC4 | | 0.05 | | 120 | <1 | n.m. |
| Comp PCC5 | 0.30 | 0.05 | 50.0 | 120 | <1 | n.m. |
| Comp PCC6 | 0.15 | 0.05 | 50.0 | >180 | <1 | n.m. |
| Comp PCC7 | | 0.05 | | >180 | <1 | n.m. |
| Comp PCC8 | | 0.05 | | >180 | <1 | n.m. |
| Comp PCC9 | 0.30 | 0.05 | | >150 | <1 | n.m. |
| Comp PCC10 | | 0.05 | | 160 | <1 | n.m. |
| Comp PCC11 | | 0.05 | | 160 | <1 | n.m. |
| Comp PCC12 | | 0.05 | | >180 | <1 | n.m. |
| Comp PCC13 | | 0.05 | | >180 | <1 | n.m. |
| Comp PCC14 | 0.005 | 0.05 | | 160 | <1 | n.m. |
| Comp PCC15 | 0.15 | 0.05 | 50.0 | 120 | <1 | G0 |
| Comp PCC16 | 0.29 | 0.05 | 50.0 | 100 | <1 | G0 |
| Comp PCC17 | 0.29 | 0.05 | 50.0 | 120 | <1 | G0 |
| Comp PCC18 | 0.15 | 0.05 | 50.0 | >180 | <1 | n.m. |
| Comp PCC19 | 0.22 | 0.05 | 50.0 | 120 | <1 | G5 |
| PCC1 | 0.38 | 0.05 | 50.0 | 100 | 7.0 | G0 |
| PCC2 | 0.38 | 0.05 | 50.0 | 120 | 7.0 | G0 |
| PCC3 | 0.38 | 0.05 | 50.0 | 120 | 6.2 | G0 |
| PCC4 | 0.38 | 0.05 | 50.0 | 120 | 6.3 | G0 |
| PCC5 | 0.38 | 0.05 | 50.0 | 120 | 7.0 | G0 |

TABLE 4

Composition of heat-curable powder coating compositions and properties of their corresponding powder coatings

| Heat-curable powder coating composition | Amorphous polyester | Amount (g) | Crystalline polyester | Amount (g) | wt % crystalline polyester on total amount of amorphous polyester and crystalline polyester | Tert-butyl perbenzoate (pph) | Cobalt stearate (g) |
|---|---|---|---|---|---|---|---|
| Comp PCC20 | PE10 | 100.0 | | | 0.0 | 1.6 | 0.29 |
| Comp PCC21 | PE10 | 95.0 | PE14 | 5.0 | 5.0 | 1.6 | 0.29 |
| PCC6 | PE10 | 90.0 | PE14 | 10.0 | 10.0 | 1.6 | 0.29 |
| PCC7 | PE10 | 80.0 | PE14 | 20.0 | 20.0 | 1.6 | 0.29 |
| PCC8 | PE10 | 70.0 | PE14 | 0.0 | 30.0 | 1.6 | 0.29 |
| PCC9 | PE10 | 60.0 | PE14 | 40.0 | 40.0 | 1.6 | 0.29 |
| PCC10 | PE10 | 50.0 | PE14 | 50.0 | 50.0 | 1.6 | 0.29 |
| Comp PCC22 | PE10 | 0.0 | PE14 | 100.0 | 100.0 | 1.6 | 0.29 |

| Heat-curable powder coating composition | Composition of heat-curable powder coating composition | | Property of powder coating | | |
|---|---|---|---|---|---|
| | Tert-butyl hydroquinone (g) | Kronos 2160 (g) | Temperature (° C.) for 100 ADR | Minimum depth of indentation to cause failure (mm) | Adhesion (Gitterschnitt) |
| Comp PCC20 | 0.05 | 50.0 | 110 | <1 | G1 |
| Comp PCC21 | 0.05 | 50.0 | 100 | <1 | G0 |
| PCC6 | 0.05 | 50.0 | 110 | 1.4 | G0 |
| PCC7 | 0.05 | 50.0 | 110 | 2.6 | G1 |
| PCC8 | 0.05 | 50.0 | 110 | 2.7 | G0 |
| PCC9 | 0.05 | 50.0 | 120 | 4.7 | G1 |
| PCC10 | 0.05 | 50.0 | 120 | 4.5 | G1 |
| Comp PCC22 | 0.05 | 50.0 | 120 | <1 | G0 |

TABLE 5

Composition of heat-curable powder coating compositions and properties of their corresponding powder coatings

| Heat-curable powder coating composition | Amorphous polyester | Amount of amorphous polyester (g) | WPU Amorphous polyester | Crystalline polyester | Amount of crystalline polyester (g) | WPUstalline polyester | amount of amorphous polyester and crystalline polyester |
|---|---|---|---|---|---|---|---|
| Comp PCC23 | PE3 | 80.0 | 920 | PE14 | 20.0 | 500 | 20.0 |
| Comp PCC24 | PE4 | 80.0 | 875 | PE14 | 20.0 | 500 | 20.0 |
| PCC11 | PE5 | 80.0 | 775 | PE14 | 20.0 | 500 | 20.0 |
| PCC12 | PE6 | 80.0 | 725 | PE14 | 20.0 | 500 | 20.0 |
| PCC7 | PE10 | 80.0 | 500 | PE14 | 20.0 | 500 | 20.0 |
| PCC13 | PE10 | 80.0 | 500 | PE20 | 20.0 | 1000 | 20.0 |
| PCC14 | PE10 | 80.0 | 500 | PE18 | 20.0 | 800 | 20.0 |
| PCC15 | PE10 | 80.0 | 500 | PE19 | 20.0 | 900 | 20.0 |

| Heat-curable powder coating composition | Tert-butyl perbenzoate (pph) | Cobalt stearate (g) | Tert-butyl hydroquinone (g) | Kronos 2160 (g) | Temperature (° C.) for 100 ADR | Minimum depth of indentation to cause failure (mm) | Adhesion (Gitterschnitt) |
|---|---|---|---|---|---|---|---|
| Comp PCC23 | 1.6 | 0.29 | 0.05 | 50.0 | 120 | <1 | G0 |
| Comp PCC24 | 1.6 | 0.29 | 0.05 | 50.0 | 120 | <1 | G0 |
| PCC11 | 1.6 | 0.29 | 0.05 | 50.0 | 120 | 1.2 | G0 |
| PCC12 | 1.6 | 0.29 | 0.05 | 50.0 | 120 | 3.5 | G0 |
| PCC7 | 1.6 | 0.29 | 0.05 | 50.0 | 110 | 2.6 | G0 |
| PCC13 | 1.6 | 0.29 | 0.05 | 50.0 | 120 | 3.4 | G3 |
| PCC14 | 1.6 | 0.29 | 0.05 | 50.0 | 120 | 2.0 | G0 |
| PCC15 | 1.6 | 0.29 | 0.05 | 50.0 | 120 | 3.0 | G3 |

TABLE 6

Composition of heat-curable powder coating compositions and properties of their corresponding powder coatings

| Heat-curable powder coating composition | Amorphous polyester | Amount (g) | Crystalline polyester | Amount (g) | wt % crystalline polyester on total amount of amorphous polyester and crystalline polyester | Tert-amyl peroxy (2-ethyl) hexanoate (pph) | Dibenzoyl peroxide (pph) | Tert-butyl perbenzoate (pph) |
|---|---|---|---|---|---|---|---|---|
| Comp PCC25 | PE10 | 80.0 | PE14 | 20.0 | 20.0 | | | |
| Comp PCC26 | PE10 | 80.0 | PE14 | 20.0 | 20.0 | | | |
| Comp PCC27 | PE10 | 80.0 | PE14 | 20.0 | 20.0 | | | |
| Comp PCC28 | PE10 | 80.0 | PE14 | 20.0 | 20.0 | | | |
| PCC16 | PE10 | 80.0 | PE14 | 20.0 | 20.0 | 1.8 | | |
| PCC17 | PE10 | 80.0 | PE14 | 20.0 | 20.0 | | 4.1 | |
| PCC18 | PE10 | 80.0 | PE14 | 20.0 | 20.0 | | | 0.4 |
| PCC19 | PE10 | 80.0 | PE14 | 20.0 | 20.0 | | | 0.6 |
| PCC20 | PE10 | 80.0 | PE14 | 20.0 | 20.0 | | | 0.7 |
| PCC21 | PE10 | 80.0 | PE14 | 20.0 | 20.0 | | | 0.8 |
| PCC7 | PE10 | 80.0 | PE14 | 20.0 | 20.0 | | | 1.6 |

| Heat-curable powder coating composition | Dicumylperoxide (pph) | t-Butylhydroperoxide (pph) | Cobalt stearate (g) | Tert-butyl hydroquinone (g) | Kronos 2160 (g) | Temperature (° C.) for 100 ADR | Minimum depth of indentation to cause failure (mm) | Adhesion (Gitterschnitt) |
|---|---|---|---|---|---|---|---|---|
| Comp PCC25 | 2.2 | | | 0.05 | 50.0 | >180 | n.m. | n.m |
| Comp PCC26 | 2.2 | | 0.29 | 0.05 | 50.0 | >180 | n.m. | n.m |
| Comp PCC27 | | 1.0 | | 0.05 | 50.0 | >180 | n.m. | n.m |
| Comp PCC28 | | 1.0 | 0.29 | 0.05 | 50.0 | n.p.e | n.p.e | n.p.e |
| PCC16 | | | 0.29 | 0.05 | 50.0 | 100 | 1.6 | G0 |
| PCC17 | | | 0.29 | 0.05 | 50.0 | 130 | 6.3 | G0 |
| PCC18 | | | 0.29 | 0.05 | 50.0 | >130 | n.m. | n.m |
| PCC19 | | | 0.29 | 0.05 | 50.0 | 120 | 0.7 | G0 |
| PCC20 | | | 0.29 | 0.05 | 50.0 | 120 | 1.2 | G0 |

TABLE 6-continued

Composition of heat-curable powder coating compositions and properties of their corresponding powder coatings

| PCC21 | 0.29 | 0.05 | 50.0 | 120 | 2.6 | G0 |
| PCC7  | 0.29 | 0.05 | 50.0 | 110 | 2.6 | G0 |

As can be seen from the Examples in Tables 3-6 in combination with the Examples in Table 1, only when a heat-curable powder coating compositions comprising:
  i) at least one crystalline polyester resin present in an amount of at least 7.5 wt %; and
  ii) at least one amorphous polyester resin present in an amount of at most 92.5 wt %; and
  iii) at least one peroxide present in an amount of at least 0.65 parts of peroxide in hundred parts of i)+ii) (pph), wherein,
    the at least one crystalline polyester resin has 2-butenedioic acid ethylenic unsaturations and/or the at least one amorphous polyester resin has 2-butenedioic acid ethylenic unsaturations;
    if the at least one amorphous polyester resin has 2-butenedioic acid ethylenic unsaturations, then the theoretical weight per ethylenic unsaturation (WPU) of the at least one amorphous polyester resin is at most 850 g/mol;
    the wt % is based on the total amount of i)+ii);
    the peroxide is chosen from the group of peresters and monopercarbonates according to formula (I)

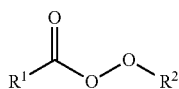

(I)

wherein $R^1$ represents an optionally substituted $C_{1-20}$alkyl, a $C_{6-20}$aryl or for $OR^5$, wherein $R^5$ represents an optionally substituted $C_{1-20}$alkyl or for an optionally substituted $C_{6-20}$aryl; $R^2$ represents an optionally substituted $C_{1-20}$alkyl or for an optionally substituted $C_{6-20}$aryl; and
peranhydrides of formula (II)

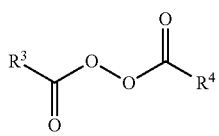

(II)

wherein $R^3$ and $R^4$ each independently stand for an optionally substituted $C_{1-20}$alkyl, a $C_{6-20}$aryl or for $OR^6$, wherein $R^6$ represents an optionally substituted $C_{1-10}$alkyl or a$C_{6-20}$aryl; and any combination of peroxides according to formula (I) and formula (II) thereof,
were used to prepare powder coatings, said compositions were cured to an acceptable degree at low temperature for example at 130° C. for at most 20 minutes, said compositions were ground, sieved and extruded and said compositions upon heat cure formed powder coatings that exhibited enhanced flexibility. The compositions of the invention upon heat curing formed powder coatings that exhibited good adhesion. In addition, the compositions of the invention can suitably be used on heat- and/or non heat-sensitive, even if the composition is highly pigmented. This can be seen by comparing the comparative examples of Tables 3-6 with the Examples according to the invention.

More particularly, as can be seen from the Examples in Table 3, the combination of a crystalline polyester resin, an amorphous polyester resin and a peroxide according to the invention, in particular the introduction of the former, has surprisingly afforded powder coatings compositions that were cured to an acceptable degree at low temperature for example at 130° C. for at most 20 minutes, said compositions were ground, sieved and extruded and said compositions upon heat cure formed powder coatings that exhibited enhanced flexibility. The compositions of the invention upon heat curing formed powder coatings that exhibited good adhesion. In addition, the compositions of the invention can suitably be used on heat- and/or non heat-sensitive, even if the composition is highly pigmented. This can be seen by comparing the comparative examples of Table 3 with the Examples according to the invention.

As can be seen from the Examples in Table 4, the combination of a crystalline polyester resin, an amorphous polyester resin and a peroxide according to the invention, in particular the introduction of the former in an amount of at least 7.5 wt %, has surprisingly afforded powder coatings compositions that were cured to an acceptable degree at low temperature for example at 130° C. for at most 20 minutes, said compositions were ground, sieved and extruded and said compositions upon heat cure formed powder coatings that exhibited enhanced flexibility. The compositions of the invention upon heat curing formed powder coatings that exhibited good adhesion. In addition, the compositions of the invention can suitably be used on heat- and/or non heat-sensitive, even if the composition is highly pigmented. This can be seen by comparing the comparative examples of Table 4 with the Examples according to the invention.

As can be seen from the Examples in Table 5, the combination of a crystalline polyester resin, an amorphous polyester resin and a peroxide according to the invention, in particular when the amorphous polyester resin has 2-butenedioic acid ethylenic unsaturations and a theoretical WPU of at most 850 g/mol and/or the theoretical WPU of the amorphous and crystalline polyester resins is less than 2,500 g/mol, has surprisingly afforded powder coatings compositions that were cured to an acceptable degree at low temperature for example at 130° C. for at most 20 minutes, said compositions were ground, sieved and extruded and said compositions upon heat cure formed powder coatings that exhibited enhanced flexibility. The compositions of the invention upon heat curing formed powder coatings that exhibited good adhesion. In addition, the compositions of the invention can suitably be used on heat- and/or non heat-sensitive, even if the composition is highly pigmented. This can be seen by comparing the comparative examples of Table 5 with the Examples according to the invention.

As can be seen from the Examples in Table 6, the combination of a crystalline polyester resin, an amorphous polyester resin and a peroxide according to the invention, in particular when the peroxide reads on formula (I) or formula (II) and is present in an amount of at least 0.65 pph, has surprisingly afforded powder coatings compositions that were cured to an acceptable degree at low temperature for example at 130° C. for at most 20 minutes, said compositions were ground, sieved and extruded and said compositions upon heat cure formed powder coatings that exhibited enhanced flexibility. The compositions of the invention upon heat curing formed powder coatings that exhibited good adhesion. In addition, the compositions of the invention can suitably be used on heat- and/or non heat-sensitive, even if the composition is highly pigmented. More preferred heat-curable powder coating compositions have a peroxide that reads on formula (I) or formula (II) and is present in an amount of at least 0.80 pph since they afforded powder coatings with further enhanced flexibility. This can be seen by comparing the comparative examples of Table 6 with the Examples according to the invention.

The invention claimed is:

1. A heat-curable powder coating composition comprising:
   i) at least one crystalline polyester resin present in an amount of at least 7.5 wt %;
   ii) at least one amorphous polyester resin present in an amount of at most 92.5 wt % ; and
   iii) at least one peroxide present in an amount of at least 0.65 parts of peroxide in hundred parts of i)+ii) (pph), wherein,
   the composition contains no crosslinking agent; and wherein
   the at least one crystalline polyester resin and/or the at least one amorphous polyester resin has 2-butenedioic acid ethylenic unsaturations, and wherein
   the at least one crystalline polyester resin has a melting temperature ($T_m$) of at least 30° C. and at most 160° C., a theoretical weight per ethylenic unsaturation (WPU) of at least 250 and at most 2000 g/mol and a crystallization temperature ($T_c$) which is at most 55° C. lower than its Tm; and wherein
   if the at least one amorphous polyester resin has 2-butenedioic acid ethylenic unsaturations, then the theoretical weight per ethylenic unsaturation (WPU) of the at least one amorphous polyester resin is at most 850 g/mol;
   each of $T_m$ and $T_c$ is measured via differential scanning calorimetry (DSC); and
   the wt % is based on the total amount of i)+ii); and wherein
   the peroxide is at least one selected from the group consisting of:
   (a) peresters and monopercarbonates according to formula (I)

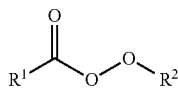

(I)

wherein
$R^1$ represents an optionally substituted $C_{1-20}$alkyl, a $C_{6-20}$aryl or $OR^5$, where $R^5$ represents an optionally substituted $C_{1-20}$alkyl or an optionally substituted $C_{6-20}$aryl; and
$R^2$ represents an optionally substituted $C_{1-20}$alkyl or an optionally substituted $C_{6-20}$aryl;

(b) peranhydrides of formula (II)

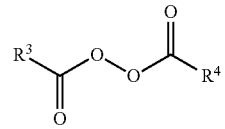

(II)

wherein $R^3$ and $R^4$ each independently stand for an optionally substituted $C_{1-20}$alkyl, a $C_{6-20}$aryl or $OR^6$, wherein $R^6$ represents an optionally substituted $C_{1-10}$alkyl or a $C_{6-20}$aryl; and (c) any combination of peroxides according to formula (I) and formula (II) thereof.

2. The composition according to claim 1, wherein the at least one crystalline polyester resin is present in an amount of at most 85 wt % and wherein the at least one amorphous polyester resin is present in an amount of at least 15 wt %.

3. The composition according to claim 1, wherein the at least one crystalline polyester resin is present in an amount of at least 10 and at most 40 wt % and wherein the at least one amorphous polyester resin is present in an amount of at least 60 and at most 90 wt %.

4. The composition according to claim 1, wherein the at least one crystalline polyester resin is present in an amount of at least 17.5 and at most 50 wt % and wherein the at least one amorphous polyester resin is present in an amount of at least 50 and at most 82.5 wt %.

5. The composition according to claim 1, wherein the at least one crystalline polyester resin is present in an amount of at least 20 and at most 50 wt % and wherein the at least one amorphous polyester resin is present in an amount of at least 50 and at most 80 wt %.

6. The composition according to claim 1, wherein the at least one crystalline polyester resin is present in an amount of at least 20 and at most 40 wt % and wherein the at least one amorphous polyester resin is present in an amount of at least 60 and at most 80 wt %.

7. The composition according to claim 1, wherein each of the at least one crystalline polyester resin and the at least amorphous polyester resin, have a theoretical Mn of at least 2,200 Da and at most 8,000 Da.

8. The composition according to claim 6, wherein each of the at least one crystalline polyester resin and the at least amorphous polyester resin, have a theoretical Mn of at least 2,200 Da and at most 8,000 Da.

9. The composition according to claim 1, wherein the at least one crystalline polyester resin and/or the at least one amorphous polyester resin has other ethylenic unsaturations based on di-acid or anhydride monomers other than 2-butenedioic acid ethylenic unsaturations.

10. The composition according to claim 7, wherein the at least one crystalline polyester resin and/or the at least one amorphous polyester resin has other ethylenic unsaturations based on di-acid or anhydride monomers other than 2-butenedioic acid ethylenic unsaturations.

11. The composition according to claim 8, wherein the at least one crystalline polyester resin and/or the at least one amorphous polyester resin has other ethylenic unsaturations based on di-acid or anhydride monomers other than 2-butenedioic acid ethylenic unsaturations.

12. The composition according to claim 1, wherein each of the at least one crystalline polyester resin and the at least one amorphous polyester resin, has 2-butenedioic acid ethylenic unsaturations.

13. The composition according to claim 6, wherein each of the at least one crystalline polyester resin and the at least one amorphous polyester resin, has 2-butenedioic acid ethylenic unsaturations.

14. The composition according to claim 7, wherein each of the at least one crystalline polyester resin and the at least one amorphous polyester resin, has 2-butenedioic acid ethylenic unsaturations.

15. The composition according to claim 8, wherein each of the at least one crystalline polyester resin and the at least one amorphous polyester resin, has 2-butenedioic acid ethylenic unsaturations.

16. The composition according to claim 9, wherein each of the at least one crystalline polyester resin and the at least one amorphous polyester resin, has 2-butenedioic acid ethylenic unsaturations.

17. The composition according to claim 10, wherein each of the at least one crystalline polyester resin and the at least one amorphous polyester resin, has 2-butenedioic acid ethylenic unsaturations.

18. The composition according to claim 11, wherein each of the at least one crystalline polyester resin and the at least one amorphous polyester resin, has 2-butenedioic acid ethylenic unsaturations.

19. The composition according to claim 1, wherein the peroxide is present in an amount of at least 0.8 pph.

20. The composition according to claim 6, wherein the peroxide is present in an amount of at least 0.8 pph.

21. The composition according to claim 7, wherein the peroxide is present in an amount of at least 0.8 pph.

22. The composition according to claim 8, wherein the peroxide is present in an amount of at least 0.8 pph.

23. The composition according to claim 9, wherein the peroxide is present in an amount of at least 0.8 pph.

24. The composition according to claim 10, wherein the peroxide is present in an amount of at least 0.8 pph.

25. The composition according to claim 11, wherein the peroxide is present in an amount of at least 0.8 pph.

26. The composition according to claim 12, wherein the peroxide is present in an amount of at least 0.8 pph.

27. The composition according to claim 13, wherein the peroxide is present in an amount of at least 0.8 pph.

28. The composition according to claim 14, wherein the peroxide is present in an amount of at least 0.8 pph.

29. The composition according to claim 15, wherein the peroxide is present in an amount of at least 0.8 pph.

30. The composition according to claim 16, wherein the peroxide is present in an amount of at least 0.8 pph.

31. The composition according to claim 17, wherein the peroxide is present in an amount of at least 0.8 pph.

32. The composition according to claim 18, wherein the peroxide is present in an amount of at least 0.8 pph.

33. The composition according to claim 19, wherein the peroxide is present in an amount of at most 10 pph.

34. The composition according to claim 20, wherein the peroxide is present in an amount of at most 10 pph.

35. The composition according to claim 21, wherein the peroxide is present in an amount of at most 10 pph.

36. The composition according to claim 22, wherein the peroxide is present in an amount of at most 10 pph.

37. The composition according to claim 23, wherein the peroxide is present in an amount of at most 10 pph.

38. The composition according to claim 24, wherein the peroxide is present in an amount of at most 10 pph.

39. The composition according to claim 25, wherein the peroxide is present in an amount of at most 10 pph.

40. The composition according to claim 26, wherein the peroxide is present in an amount of at most 10 pph.

41. The composition according to claim 27, wherein the peroxide is present in an amount of at most 10 pph.

42. The composition according to claim 28, wherein the peroxide is present in an amount of at most 10 pph.

43. The composition according to claim 29, wherein the peroxide is present in an amount of at most 10 pph.

44. The composition according to claim 30, wherein the peroxide is present in an amount of at most 10 pph.

45. The composition according to claim 31, wherein the peroxide is present in an amount of at most 10 pph.

46. The composition according to claim 32, wherein the peroxide is present in an amount of at most 10 pph.

47. The composition according to claim 1, wherein the composition further comprises a transition metal compound comprising a transition metal salt, a transition metal complex, or mixtures thereof, of a transition metal selected from the group consisting of Mn, Fe, Co and Cu.

48. The composition according to claim 8, wherein the composition further comprises a transition metal compound comprising a transition metal salt, a transition metal complex, or mixtures thereof, of a transition metal selected from the group consisting of Mn, Fe, Co and Cu.

49. The composition according to claim 11, wherein the composition further comprises a transition metal compound comprising a transition metal salt, a transition metal complex, or mixtures thereof, of a transition metal selected from the group consisting of Mn, Fe, Co and Cu.

50. The composition according to claim 18, wherein the composition further comprises a transition metal compound comprising a transition metal salt, a transition metal complex, or mixtures thereof, of a transition metal selected from the group consisting of Mn, Fe, Co and Cu.

51. The composition according to claim 32, wherein the composition further comprises a transition metal compound comprising a transition metal salt, a transition metal complex, or mixtures thereof, of a transition metal selected from the group consisting of Mn, Fe, Co and Cu.

52. The composition according to claim 46, wherein the composition further comprises a transition metal compound comprising a transition metal salt, a transition metal complex, or mixtures thereof, of a transition metal selected from the group consisting of Mn, Fe, Co and Cu.

53. The composition according to claim 1, wherein the composition further comprises an inhibitor selected from the group consisting of phenolic compounds, stable radicals, catechols, phenothiazines, hydroquinones, benzoquinones and mixtures thereof.

54. The composition according to claim 8, wherein the composition further comprises an inhibitor selected from the group consisting of phenolic compounds, stable radicals, catechols, phenothiazines, hydroquinones, benzoquinones and mixtures thereof.

55. The composition according to claim 11, wherein the composition further comprises an inhibitor selected from the group consisting of phenolic compounds, stable radicals, catechols, phenothiazines, hydroquinones, benzoquinones and mixtures thereof.

56. The composition according to claim 18, wherein the composition further comprises an inhibitor selected from the group consisting of phenolic compounds, stable radicals, catechols, phenothiazines, hydroquinones, benzoquinones and mixtures thereof.

57. The composition according to claim 32, wherein the composition further comprises an inhibitor selected from the group consisting of phenolic compounds, stable radicals, catechols, phenothiazines, hydroquinones, benzoquinones and mixtures thereof.

58. The composition according to claim 46, wherein the composition further comprises an inhibitor selected from the group consisting of phenolic compounds, stable radicals, catechols, phenothiazines, hydroquinones, benzoquinones and mixtures thereof.

59. The composition according to claim 52, wherein the composition further comprises an inhibitor selected from the group consisting of phenolic compounds, stable radicals, catechols, phenothiazines, hydroquinones, benzoquinones and mixtures thereof.

60. A process for the preparation of a heat-curable powder coating composition as defined in claim 1, the process comprising the steps of:
    (a) mixing the components of the heat-curable powder coating composition to obtain a premix;
    (b) heating the premix in an extruder, to obtain an extrudate;
    (c) cooling down the extrudate to obtain a solidified extrudate; and
    (d) grinding the solidified extrudate into smaller particles to obtain the heat-curable powder coating composition.

61. A process for the preparation of a heat-curable powder coating composition as defined in claim 59, the process comprising the steps of:
    (a) mixing the components of the heat-curable powder coating composition to obtain a premix;
    (b) heating the premix in an extruder, to obtain an extrudate;
    (c) cooling down the extrudate to obtain a solidified extrudate; and
    (d) grinding the solidified extrudate into smaller particles to obtain the heat-curable powder coating composition.

62. A process for coating a substrate comprising the steps of:
    (a) applying a heat-curable powder coating composition as defined in claim 1, to a substrate; and
    (b) heating the substrate.

63. A process for coating a substrate comprising the steps of:
    (a) applying a heat-curable powder coating composition as defined in claim 59, to a substrate; and
    (b) heating the substrate.

64. An at least partially cured form of a powder coating composition as defined in claim 1.

65. An at least partially cured form of a powder coating composition as defined in claim 32.

66. An at least partially cured form of a powder coating composition as defined in claim 46.

67. An at least partially cured form of a powder coating composition as defined in claim 52.

68. An at least partially cured form of a powder coating composition as defined in claim 59.

69. A substrate that is at least partially coated with a heat-curable powder coating composition as defined in claim 1.

70. A substrate that is at least partially coated with a heat-curable powder coating composition as defined in claim 59.

71. A substrate that is fully or partially coated with a coating prepared from the heat-curable powder coating composition as defined in claim 1.

72. A substrate that is fully or partially coated with a coating prepared from the heat-curable powder coating composition as defined in claim 59.

* * * * *